United States Patent
Zheng et al.

(10) Patent No.: US 11,138,685 B2
(45) Date of Patent: Oct. 5, 2021

(54) METHOD AND APPARATUS FOR WATERMARK EMBEDDING AND EXTRACTING

(71) Applicant: Alibaba Group Holding Limited, Grand Cayman (KY)

(72) Inventors: Jieqian Zheng, Hangzhou (CN); Yongliang Liu, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 162 days.

(21) Appl. No.: 16/595,297

(22) Filed: Oct. 7, 2019

(65) Prior Publication Data

US 2020/0111190 A1 Apr. 9, 2020

(30) Foreign Application Priority Data

Oct. 8, 2018 (CN) .......................... 201811167754.0

(51) Int. Cl.
*H04N 1/32* (2006.01)
*G06T 1/00* (2006.01)

(52) U.S. Cl.
CPC ....... *G06T 1/0042* (2013.01); *H04N 1/32229* (2013.01); *H04N 1/32283* (2013.01); *H04N 1/32331* (2013.01)

(58) Field of Classification Search
CPC .......... G06T 1/0042; G06T 2201/0051; G06T 2201/0061; G06T 1/0071; G06T 1/0021; H04N 1/32331
See application file for complete search history.

(56) References Cited

U.S. PATENT DOCUMENTS

| | | | | |
|---|---|---|---|---|
| 6,639,997 B1* | 10/2003 | Katsura | ................... | G06T 1/005 375/E7.04 |
| 6,728,408 B1* | 4/2004 | Echizen | ............. | H04N 1/32208 382/232 |
| 6,934,403 B2* | 8/2005 | Joo | ........................ | G06T 1/0057 382/100 |
| 7,092,545 B2* | 8/2006 | Seo | ........................ | G06T 1/0057 382/100 |
| 7,158,652 B2* | 1/2007 | Iwamura | ................ | G06T 1/0071 382/100 |
| 7,190,807 B2 | 3/2007 | Tamaru et al. | | |
| 7,616,776 B2 | 11/2009 | Petrovic et al. | | |
| 8,224,019 B2* | 7/2012 | Fan | ........................ | G06F 40/169 382/100 |
| 8,243,984 B1* | 8/2012 | Brown | ................... | G06Q 30/06 382/100 |
| 8,538,066 B2 | 9/2013 | Petrovic et al. | | |

(Continued)

FOREIGN PATENT DOCUMENTS

CN 111415288 A * 7/2020

*Primary Examiner* — Ted W Barnes
(74) *Attorney, Agent, or Firm* — Lee & Hayes, P.C.

(57) ABSTRACT

Methods and apparatuses for watermark embedding and extracting are provided. A method for watermark embedding includes obtaining a carrier object and watermark information to be embedded in the carrier object; generating at least one encoding region including the watermark information according to the watermark information, the at least one encoding region including a plurality of template lattices; obtaining a watermark image according to the at least one encoding region; and embedding the watermark image in the carrier object.

20 Claims, 14 Drawing Sheets

(56) References Cited

U.S. PATENT DOCUMENTS

| | | |
|---|---|---|
| 8,806,215 B2 | 8/2014 | Chen et al. |
| 8,914,638 B2 | 12/2014 | Kawamoto et al. |
| 2002/0199106 A1* | 12/2002 | Hayashi ............. H04N 1/32229 <br> 713/176 |
| 2004/0006696 A1 | 1/2004 | Shin et al. |
| 2004/0039914 A1* | 2/2004 | Barr ...................... G06T 1/0071 <br> 713/176 |
| 2005/0018845 A1* | 1/2005 | Suzaki ................. G06T 1/0028 <br> 380/243 |
| 2005/0117775 A1* | 6/2005 | Wendt ................ H04N 1/32149 <br> 382/100 |
| 2005/0259844 A1* | 11/2005 | Kot ....................... G06T 1/0028 <br> 382/100 |
| 2006/0233420 A1* | 10/2006 | Rhoads .............. G06Q 20/1235 <br> 382/100 |
| 2007/0147657 A1* | 6/2007 | Sato ..................... G06T 1/0028 <br> 382/100 |
| 2008/0080009 A1* | 4/2008 | Masui .................. G06T 1/0028 <br> 358/3.28 |
| 2008/0101650 A1* | 5/2008 | Ejima ................ H04N 1/32144 <br> 382/100 |
| 2008/0198216 A1* | 8/2008 | Masui .................. H04N 1/32208 <br> 347/110 |
| 2008/0273741 A1* | 11/2008 | Fujii .................. H04N 1/32208 <br> 382/100 |
| 2008/0292129 A1* | 11/2008 | Fan ...................... G06F 40/163 <br> 382/100 |
| 2009/0010487 A1* | 1/2009 | Maeno ............... H04N 1/32203 <br> 382/100 |
| 2009/0147985 A1 | 6/2009 | Chen et al. |
| 2009/0290750 A1* | 11/2009 | Tapson .................... G06T 1/005 <br> 382/100 |
| 2010/0063978 A1 | 3/2010 | Lee et al. |
| 2010/0067736 A1* | 3/2010 | Kihara ................. G06T 1/0028 <br> 382/100 |
| 2010/0177977 A1* | 7/2010 | Seshadri ............ H04N 1/32288 <br> 382/248 |
| 2010/0284563 A1* | 11/2010 | Miller ................ H04N 1/32203 <br> 382/100 |
| 2011/0058188 A1* | 3/2011 | Guo .................... H04N 1/32277 <br> 358/1.9 |
| 2012/0275641 A1* | 11/2012 | Al-Omari ............. G06T 1/0071 <br> 382/100 |
| 2013/0148842 A1* | 6/2013 | Kuraki ................. G06T 1/0085 <br> 382/100 |
| 2013/0170695 A1* | 7/2013 | Anan ..................... G06T 1/0021 <br> 382/100 |
| 2013/0259294 A1* | 10/2013 | Mehta .................. G06T 1/0028 <br> 382/100 |
| 2014/0282695 A1* | 9/2014 | Bakar ................... H04N 21/812 <br> 725/32 |
| 2017/0249715 A1* | 8/2017 | Lee ...................... G06T 1/0064 |
| 2017/0345119 A1* | 11/2017 | Asthana ............... G06T 1/0071 |
| 2018/0091871 A1* | 3/2018 | Nakagata ............. G06T 1/0028 |
| 2018/0232844 A1* | 8/2018 | Cai .................... H04N 1/32251 |
| 2019/0066254 A1* | 2/2019 | Tung ........................ G06T 5/40 |
| 2019/0279330 A1* | 9/2019 | Kim ...................... G06T 1/0071 |

* cited by examiner

300

| | 1 | 2 |
|---|---|---|
| 3 | 4 | 5 |
| 6 | 7 | 8 |

| | 4 | 5 |
|---|---|---|
| 2 | 3 | 8 |
| 7 | 6 | 1 |

FIG. 4

METHOD AND APPARATUS FOR WATERMARK EMBEDDING AND EXTRACTING

CROSS REFERENCE TO RELATED PATENT APPLICATIONS

The application claims priority to Chinese Patent Application No. 201811167754.0, filed on Oct. 8, 2018, entitled "Watermark Embedding and Watermark Extraction Method, Apparatus and Device," which is hereby incorporated by reference in its entirety.

TECHNICAL FIELD

The present disclosure relates to a digital watermark embedding technology, and in particular, to methods, apparatuses, electronic devices, and storage devices for watermark embedding. The present disclosure further relates to methods, apparatuses, electronic devices, and storage devices for watermark extracting.

BACKGROUND

At present, visible watermark information is added to a webpage and a page, such as the address book. The watermark information includes information such as name, employee ID (or part of a personal ID number) or mobile phone number and can uniquely determine the identity information of a visitor of the webpage. The watermark information can serve as a warning to the visitor not to disclose the sensitive information of the webpage or the page. To some extent, after the webpage or the sensitive information of the page is leaked, the leak source can be traced but only if the watermark information is not replaced (i.e., using an existing watermark image to replace other watermark images), not forged (i.e., when there is no existing watermark image, forging a watermark image), or not falsified (i.e., editing or modifying the existing watermark image).

The watermark information in existing watermark embedding scheme can be easily removed or destroyed mostly or nearly completely, and the attacker only needs to destroy the displayed watermark information bit by bit with an image processing tool and barely needs any technical background. The watermark information can also be batch destroyed, or even be forged or tampered with, for example, by searching for matching and replacing.

The main cause of the attack is that the embedded visible watermark information can be easily identified, falsified or tampered with. The potential vulnerability to the watermark has a great impact on the security of the watermark, which affects the validity and reliability of the watermark-based source tracing scheme. For example, after the watermark is removed, the source of attack cannot be traced. More seriously, the false watermark information may lead to innocent sources and make it possible to frame others. The real data leaker may also use this as an excuse to deny the behavior of leaking data. These may make the watermark source tracing scheme lose or be deprived of its credibility.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

The present disclosure may provide a watermark embedding method to solve the problem that the watermark information is easy identified, forged or tampered with in the existing technologies.

The disclosure may provide a watermark embedding method including obtaining a carrier object and watermark information to be embedded in the carrier object; generating at least one encoding region including watermark information according to the watermark information, the at least one encoding region including a plurality of template lattices; obtaining a watermark image according to the at least one encoding region; and embedding the watermark image in the carrier object.

In implementations, the at least one encoding area may include a plurality of encoding areas, and the obtaining a watermark image according to the at least one encoding area includes splicing the plurality of encoding areas to obtain the watermark image.

In implementations, the at least one encoding area may include a plurality of equal number of square lattices in length and width.

In implementations, the plurality of template lattices may include preset dots, and a border spacing between adjacent template lattices is half of the spacing between the preset dots.

In implementations, the plurality of template lattices may comprise a set of positioning template lattices and encoding template lattice(s), the encoding template lattice(s) including the watermark information.

In implementations, the count of positioning template lattices in the at least one encoding area may be four.

In implementations, three positioning template lattices and an encoding template lattice may be placed on two by two template lattices at upper left of the at least one encoding region, and one remaining positioning template lattice may be placed on a template lattice at lower right of the at least one encoding region.

In implementations, a count of positioning template lattices in the four positioning template lattices may be set as random positioning template lattices.

In implementations, the generating at least one coding region including the watermark information according to the watermark information may further comprise selecting the count of template lattices from the set of positioning template lattices; filling information associated with the count of template lattices to the random positioning template lattices of the at least one encoding region; encoding the watermark information using the encoding template lattice(s) to generate encoded template information; chaos scrambling orders of the set of encoding template lattice(s) using an embedding key and information associated with the count of random positioning template lattice; filling information associated with the chaos scrambled set of encoding template lattice(s) to at least part of the at least one encoding region in order; performing hash computation on the information associated with the count of random positioning template lattices and information associated with the chaos scrambled set of encoding template lattice(s) by using the embedding key; and filling results from the hash computation to unfilled encoding template lattice(s) and positioning template lattices.

In implementations, the watermark information may include at least one of identification information of a user or device, identification information of the carrier object, or present time stamp when the watermark information is embedded.

The present disclosure may further provide a watermark extracting method including obtaining a carrier object embedded with a watermark image; determining, in the watermark image, an encoding region that includes the watermark information, the encoding region including a plurality of encoded template lattices; determining the plurality of encoding template lattices from the encoding region; and obtaining embedded watermark information according to the plurality of encoding template lattices.

In implementations, the encoding area may further include positioning template lattices.

In implementations, the count of the positioning template lattices in the encoding area may be four.

In implementations, three positioning template lattices and an encoding template lattice may be placed on two by two template lattices at upper left of the encoding region, and one remaining positioning template lattice may be placed on a template lattice at lower right of the encoding region.

In implementations, determining, in the watermark image, an encoding region that includes the watermark information may further comprise determining a set of positioning template lattices in the watermark image; and determining the encoding region according to the set of positioning template lattices.

In implementations, the determining a set of positioning template lattices in the watermark image may further comprise: extracting information associated with preset dots in the watermark image; comparing the information associated with the preset dots in the watermark image to information associated with a set of positioning template lattices; and when the information associated with the preset dots in the watermark image matches to information associated with a set of positioning template lattices, determining the set of positioning template lattices as included in the watermark image.

In implementations, the determining the encoding region according to the set of positioning template lattices may further comprise: determining whether one of two by two template lattices at corners of the encoding region matches with three positioning template lattices and an encoding template lattice; when whether one of two by two template lattices at corners of the encoding region matches with three positioning template lattices and an encoding template lattice, determining one of two by two template lattices as located at upper left of the encoding region; determining a rotation angle of the encoding region based on a location of the encoding template lattice; determining a location of the remaining positioning template lattices of the four positioning template lattices in the encoding region based on the rotation angle of the encoding region; and determining the area encompassing the four positioning template lattices and the encoding template lattice as the encoding region.

In implementations, the method may further comprise determining numbers and values associated with the four positioning template lattices and the plurality of encoding template lattices based on the encoding region and the rotation angle of the encoding region.

In implementations, obtaining embedded watermark information according to the plurality of encoded template lattices may further comprise: computing a hash value based on an extracting key, information associated with random positioning template lattices and information associated with scrambled encoded template lattices; comparing the hash value with an authentication value; descrambling the scrambled encoded template lattices using the extracting key and the information associated with random positioning template lattices in response to the hash value matching the authentication value; and decoding information associated with the descrambled encoded template lattices to obtain the watermark information.

The present disclosure may further provide an apparatus for watermark embedding. The apparatus may comprise a carrier object obtaining module, configured to obtain a carrier object and watermark information to be embedded in the carrier object; an encoding region generating module, configured to generate, according to the watermark information, at least one encoding region that includes watermark information, the at least one encoding region including a plurality of template lattices; a watermark image generating module, configured to generate a watermark image according to the at least one encoding region; and a watermark embedding module, configured to embed the watermark image into the carrier object.

The present disclosure may further provide an electronic device for watermark embedding. The electronic device may comprise one or more processors, and memory communicatively coupled to the one or more processors, the memory storing computer-executable instructions that when executed by the one or more processors, causing the one or more processors to perform operations including obtaining a carrier object and watermark information to be embedded in the carrier object; generating at least one encoding region including the watermark information according to the watermark information, the at least one encoding region including a plurality of template lattices; obtaining a watermark image according to the at least one encoding region; and embedding the watermark image in the carrier object.

The present disclosure may further provide a storage device, storing computer-readable instructions for watermark embedding that when executed by the one or more processors, cause the one or more processors to perform operations comprising obtaining a carrier object and watermark information to be embedded in the carrier object; generating at least one encoding region including the watermark information according to the watermark information, the at least one encoding region including a plurality of template lattices; obtaining a watermark image according to the at least one encoding region; and embedding the watermark image in the carrier object.

The present disclosure may further provide an apparatus for watermark extracting. The watermark extracting device may comprise a carrier object obtaining module, configured to obtain a carrier object embedded with a watermark image; an encoding region determining module, configured to determine an encoding region that includes the watermark information, the encoding region including a plurality of encoding template lattices; an encoding template lattice determining module, configured to determine the plurality of encoding template lattices in the encoding region; and a watermark information obtaining module, configured to obtain embedded watermark information according to the plurality of encoding template lattices.

The present disclosure may further provide an electronic device for watermark extracting. The electronic device may comprise one or more processors, and memory communicatively coupled to the one or more processors, the memory storing computer-executable instructions that when executed by the one or more processors, causing the one or more processors to perform operations including obtaining a carrier object embedded with a watermark image; determining, in the watermark image, an encoding region that includes the watermark information, the encoding region including a plurality of encoded template lattices; determining the plurality of encoding template lattices from the encoding region; and obtaining embedded watermark information according to the plurality of encoding template lattices.

The present disclosure may provide a storage device, storing computer-readable instructions for watermark extraction that when executed by the one or more processors, cause the one or more processors to perform operations comprising obtaining a carrier object embedded with a watermark image; determining, in the watermark image, an encoding region that includes the watermark information, the encoding region including a plurality of encoded template lattices; determining the plurality of encoding template lattices from the encoding region; and obtaining embedded watermark information according to the plurality of encoding template lattices.

The present disclosure may provide a watermark embedding method, including receiving watermark information; generating at least one encoding region including the watermark information according to the watermark information, the encoding region including a plurality of template lattices; obtaining a watermark image according to the at least one encoding region; and returning the watermark image to a client terminal.

In implementations, the method may further include obtaining a bit sequence corresponding to the watermark image according to whether the preset points of the watermark image are filled; obtaining a character string corresponding to the bit sequence according to the bit sequence; returning the watermark image to the client includes: returning a character string corresponding to the watermark image to the client terminal.

In implementations, obtaining a character string corresponding to the bit sequence according to the bit sequence may further comprise converting the bit sequence to a byte array; and obtaining the character string by encoding the byte array using base 64 encoding data.

In implementations, receiving watermark information may include receiving watermark information sent by the client terminal or a service server.

In implementations, the encoding region may include a plurality of encoding regions, and the obtaining a watermark image according to the encoding region may further comprise splicing the plurality of encoding regions to obtain the watermark image.

In implementations, the encoding region may include a plurality of equal number of square lattices in length and width.

In implementations, the plurality of template lattices may include preset dots, and a border spacing of the template lattice is half of the spacing between the preset dots.

In implementations, the encoding area may include a set of positioning template lattices and a set of encoding template lattices, the set of encoding template lattices including the watermark information.

In implementations, the count of positioning template lattices in the encoding area may be four.

In implementations, three positioning template lattices and an encoding template lattice may be disposed on a two by two lattice of an upper-left area of the encoding region, and one remaining positioning template lattice may be disposed on a lattice of a lower-right area of the encoding region.

In implementations, a count of positioning template lattices in the four positioning template lattices may be set as random positioning template lattices.

In implementations, the method may further include receiving an embedding key sent by the service server, and generating the encoding region including the watermark information according to the watermark information may further comprise selecting the count of template lattices from the set of positioning template lattices; filling information associated with the count of template lattices to the random positioning template lattices of the encoding region; encoding the watermark information using the set of encoding template lattice(s) to generate encoded template information; chaos scrambling orders of lattices in the set of encoding template lattices using an embedding key and information associated with the count of random positioning template lattice; filling information associated with the chaos scrambled lattices to at least part of the encoding region in order; performing hash computation on the information associated with the count of random positioning template lattice and information associated with the set of encoding template lattices with chaos scrambled order of lattices by using the embedding key; and filling results from the hash computation to rest unfilled encoding template lattice(s) and positioning template lattices.

The present disclosure may further provide a watermark embedding method comprising sending watermark information to be embedded in the carrier object; receiving a watermark image; and embedding the watermark image in the carrier object.

In implementations, receiving a watermark image includes receiving a character string corresponding to the watermark image, and the method may further comprise decoding the character string to generate a corresponding bit sequence; and obtaining the watermark image by filling preset dots of the watermark image according to the bit sequence.

In implementations, the character string corresponding to the watermark image may be obtained according to actions including obtaining a bit sequence corresponding to the watermark image according to whether the preset points of the watermark image are filled; and obtaining a character string corresponding to the bit sequence according to the bit sequence.

In implementations, obtaining a character string corresponding to the bit sequence according to the bit sequence may further comprise converting the bit sequence to a byte array; and obtaining the character string by encoding the byte array using base 64 encoding data.

The present disclosure may provide various advantages over the existing techniques. The present disclosure may provide a watermark embedding method, apparatus, electronic device and storage device, which generates at least one encoding region containing watermark information according to watermark information; obtains a watermark image according to the at least one coding region; and embeds the watermark image into the In the carrier object, thus, solving the problem of the watermark information being easily identified, forged or falsified in the existing techniques.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 3 illustrates an example schematic diagram of a sequence of coded template lattices before scrambling processing according to an embodiment of the present disclosure.

FIG. 4 illustrates an example schematic diagram of a sequence of coded template lattices after scrambling processing according to an embodiment of the present disclosure.

DETAILED DESCRIPTION

Numerous specific details are set forth in the description below in order to provide a thorough understanding of the invention. However, the present disclosure can be implemented in many other ways than those described herein, and a person skilled in the art can make a similar modification without departing from the spirit of the disclosure, and thus the disclosure is not limited by the specific embodiments disclosed below.

An embodiment of the present application may provide a watermark embedding method, which will be described below in conjunction with FIG. 1.

Figure 1:
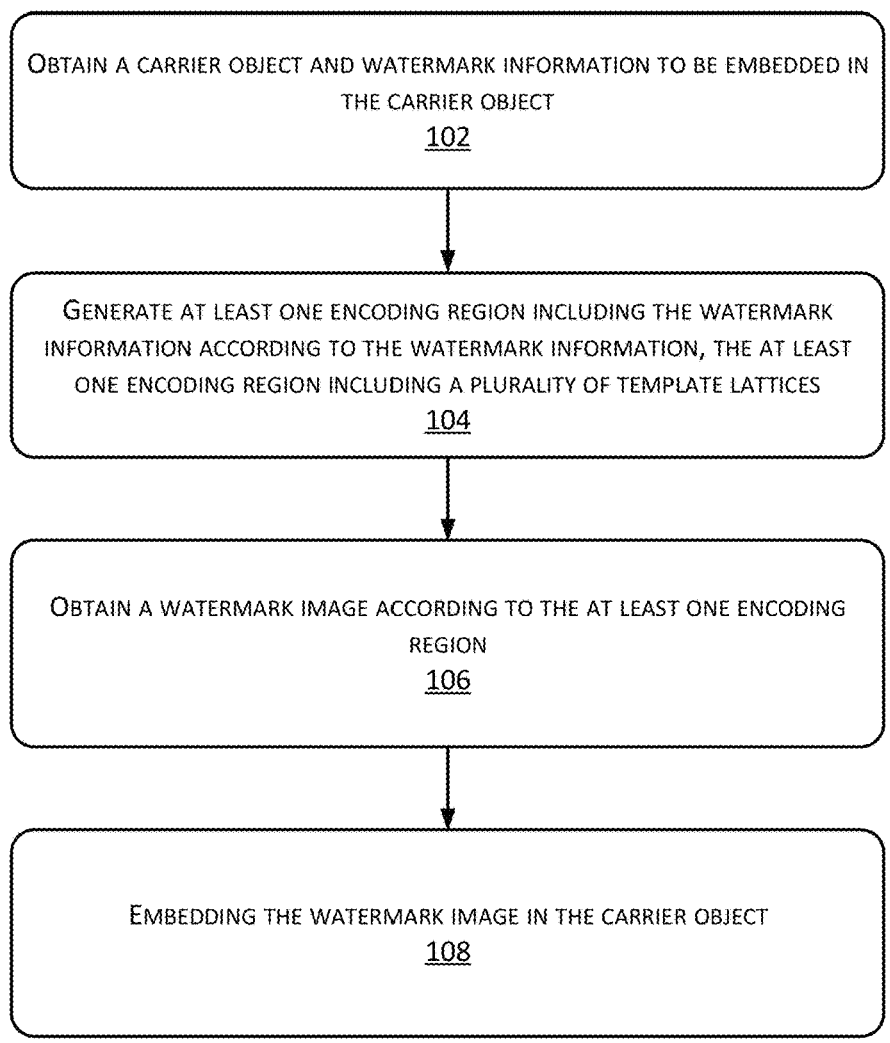
FIG. 1 illustrates an example flowchart of a watermark embedding method according to an embodiment of the present disclosure.

As shown in FIG. 1, in block 102, a carrier object and watermark information to be embedded in the carrier object may be obtained.

The carrier object may refer to an object that needs to be embedded with watermark information. The carrier object may refer to a digital carrier object such as a web page, a document, or the like.

The watermark information may refer to an identifier to be embedded in a carrier object. The watermark information may be visible that reminds the user of relevant confidentiality and permission. The watermark information can be hidden and embedded in the carrier object without affecting the use value of the carrier object and cannot be easily detected and modified. However, the watermark information may be identified and recognized by the producer. Through the watermark information hidden in the carrier object, it may be possible to confirm the content creator or the purchaser, transmit the secret information, or determine whether the carrier object has been tampered with. The watermark information may be the company name of a company, the employee ID or other identification information of an employee. The watermark information may include at least one of the following: identification information of a user or device, identification information of the carrier object, or present time stamp when the watermark information is embedded.

As shown in FIG. 1, in block 104, at least one encoding region including watermark information may be generated according to the watermark information, the at least one encoding region including a plurality of template lattices.

Figure 2:
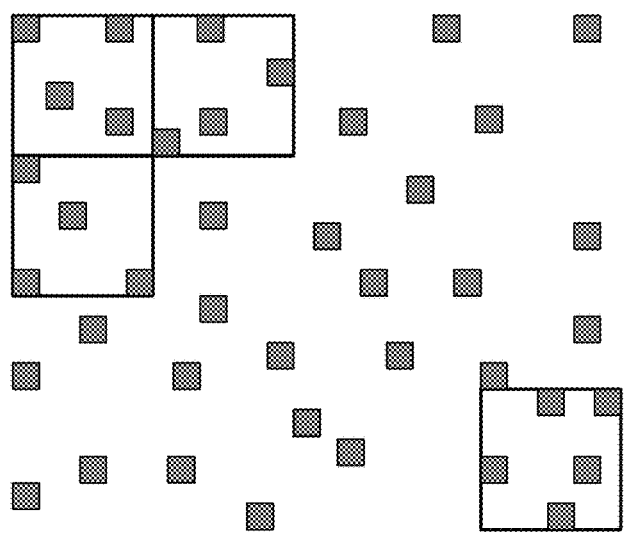
FIG. 2 illustrates an example schematic diagram of an encoding area according to an embodiment of the present disclosure.

The at least one encoding region may include a plurality of equal number of square lattices in length and width. For example, an encoding region includes 5*5 square template lattices, as shown in FIG. 2.

The plurality of template lattices may include preset dots. Spacing distances between adjacent preset dots in each template lattice are equal, and a spacing distance between borders of the template lattices is half of the spacings between adjacent present dots. The purpose is to keep all the preset dots spacings consistent after the splicing of multiple template lattices, so as to ensure that when an encoding area is randomly intercepted, the starting position and the splicing position cannot be separately identified. The preset dot may refer to a point in the template lattice into which information can be filled.

The plurality of template lattices may include a set of positioning template lattices and a set of encoding template lattices, the encoding template lattices including the watermark information. The positioning template lattices may refer to the template lattices used to determine the position of the encoding region.

In embodiments, the count of positioning template lattices in one encoding region may be four.

When the encoding region includes four positioning template lattices and an encoding template lattice, the four positioning template lattices and the encoding template lattice may be arranged in the following manner: three positioning template lattices and one encoding template lattice may be place at the upper left area of the encoding region, an angular two by two template lattice region; the remaining one positioning template lattice may be placed at the lower right area of the encoding region. As shown in FIG. 2, the encoding region includes 5*5 template lattices, where 4 template lattices are fixed positioning template lattices, and the remaining 21 are encoding template lattices.

A number of positioning template lattices among the four positioning template lattices may be preset as random positioning template lattices.

In embodiments, generating at least one encoding region including watermark information according to the watermark information may further include selecting the count of template lattices from the set of positioning template lattices; filling information associated with the count of template lattices to the random positioning template lattices of the at least one encoding region; encoding the watermark information using the set of encoding template lattices to generate encoded template lattices; chaos scrambling orders of the encoded template lattices using an embedding key and information associated with the count of random positioning template lattice; filling information associated with the chaos scrambled encoded template lattices into at least part of the at least one encoding region in order; performing hash computation on the information associated with the count of random positioning template lattices and information associated with the chaos scrambled encoded template lattices by using the embedding key; and filling results from the hash computation to unfilled encoding template lattices and positioning template lattices.

It should be understood that the count of the random positioning template lattices among the 4 positioning template lattices may be set as any numbers. The present disclosure is not intended to be limiting. The purpose of setting up a count of random positioning templates is to increase the randomness of the encoding.

The preset positioning template lattices may refer to a set of positioning template lattices that are predetermined. The preset encoding template lattices may refer to a set of encoding template lattices that are predetermined. Each template lattice may be square. The preset dots in each template lattice may be different. The type of template lattice may not change when the template lattice rotates 0, 90, 180, or 270 degrees such that even if the template lattice is rotated, the type of template lattice may not be determined to be a different type, and watermark information can still be correctly extracted. For example, a positioning template lattice is still a positioning template lattice after rotating 0, 90, 180, or 270 degrees. The corresponding value may be different, but the type of the template lattice is not determined to be an encoding template lattice. Similarly, an encoding template lattice is still an encoding template lattice after rotating 0, 90, 180, or 270 degrees. The corresponding values may be different, but the type of the template lattice is not determined to be a positioning template lattice.

In embodiments, encoding the watermark information using a preset encoding template lattice to obtain encoded template information may perform actions as follows: encoding a total number of n template lattices sequentially as 0-n–1, generating an array of encoded template lattices according to n-bits encoding, and obtaining the array as corresponding to the encoded template lattices. Further, according to the array of encoded template lattices, the n-bits array may be recovered, and the watermark information may be restored.

The remaining encoding template may refer to encoded template lattices other than the encoded template lattices used to encode the watermark information in the plurality of encoded template lattices. For example, with 21 encoded template lattices, only 20 encoded template lattices are used for encoding the watermark information, and the remaining 1 of the encoded template lattices is the remaining encoded template.

In embodiments, performing hash computation on information associated with the preset count of random positioning template lattices and the scrambled encoded template information, and filling the computation results into the remaining encoding template lattices and the remaining preset count of positioning template lattices may be implemented using an example described herein. Assuming there are m positioning template lattices, hash computation is performed on the values corresponding to the encoding template lattices and the computation results are encoded using n-bits encoding. For example, assuming there are 8 positioning template lattices and 8 states denoted as a sequence of 0-7, hash computation is performed on the values corresponding to the encoding template lattices, 3 bits are selected from the bit strings of the computation results, i.e., octal scheme, and information is filled into the corresponding encoded positioning template lattices. The authentication process may be a reversed process of the operations described above. The corresponding encoded values are obtained from the positioning template lattices and compared with the corresponding 3 bits in the bit string of the computation results. The order of the encoded template lattices may be chaos scrambled by using the embedding key and information associated with the preset count of random positioning template lattices. The information associated with the encoding template lattices may be sequentially filled into the encoding region in the order of chaos scrambling.

In embodiments, hash computation may be performed by using the embedding key and values associated with two random positioning template lattices. The hash value generated from the hash computation may be used as the key information of the chaos scrambling algorithm. The chaos scrambling algorithm may be applied to scramble the orders of the encoded template lattices. After scrambling, the positions of the encoded template lattices change, the template type and the template value do not change, and information of the scrambled encoded template lattices is sequentially filled into the encoding region.

Chaos scrambling may refer to inputting an initial value (i.e., the generated hash value), generating a chaotic array according to a certain rule, and scrambling an original order according to a chaotic array. Descrambling may refer to a reverse operation of the scrambling. A same chaotic array may be used for descrambling. Different initial values may generate different chaotic arrays.

Figure 3:
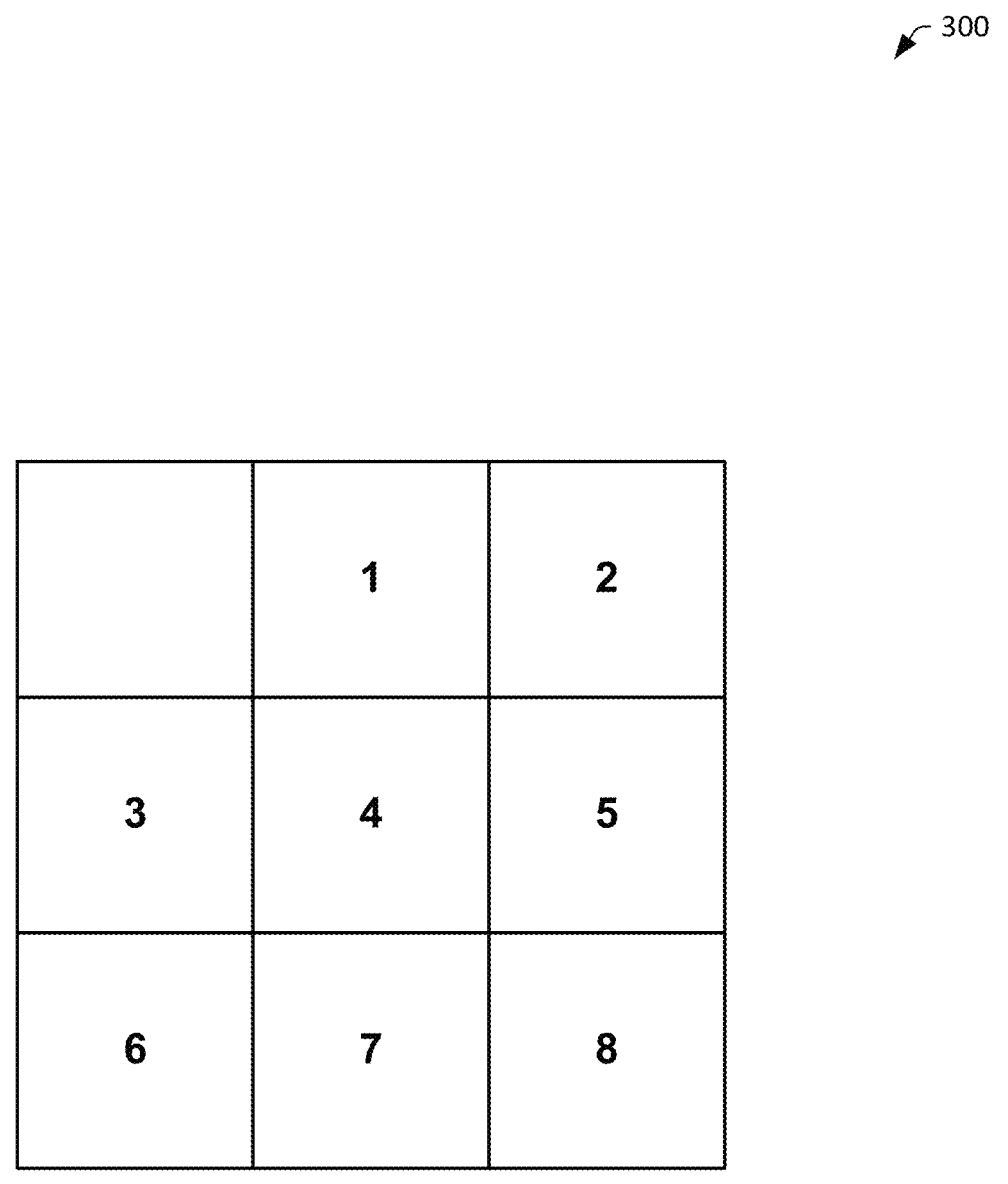
Figure 4:
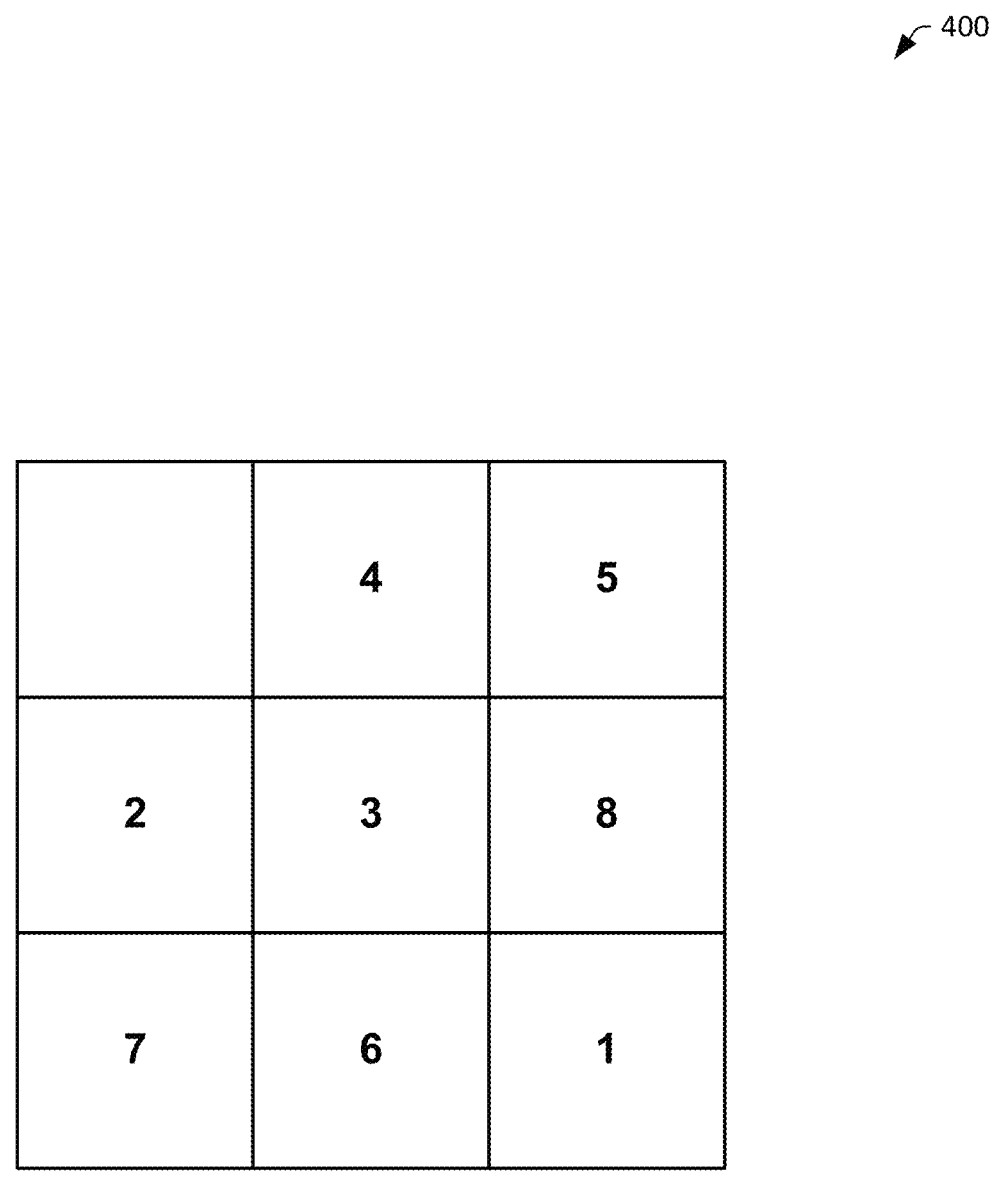

As shown in FIG. 3, the original order of values of the encoding template lattices is fixed as Ser. No. 12/345,678. The scrambled values according to an initial value are 45238761, as shown in FIG. 4. The scrambled values are then filled into the encoding region in the scrambled order. When extracting the watermark information, the initial value is obtained according to the embedding key and the values associated with the positioning template lattices, then the order after the scrambling, i.e., 45238761 is determined based on the initial value, and the values of 12345678 are correctly obtained in a corresponding order. As the scrambling order is generated differently according to different embedding keys and values associated with the random positioning template lattices, only with the corresponding embedding key and values associated with the random positioning template lattices, the order after the scrambling, i.e., 45238761 can be known and thus, a correct order can be recovered.

As shown in FIG. 1, in block 106, a watermark image may be obtained according to the at least one encoding region.

Figure 5:
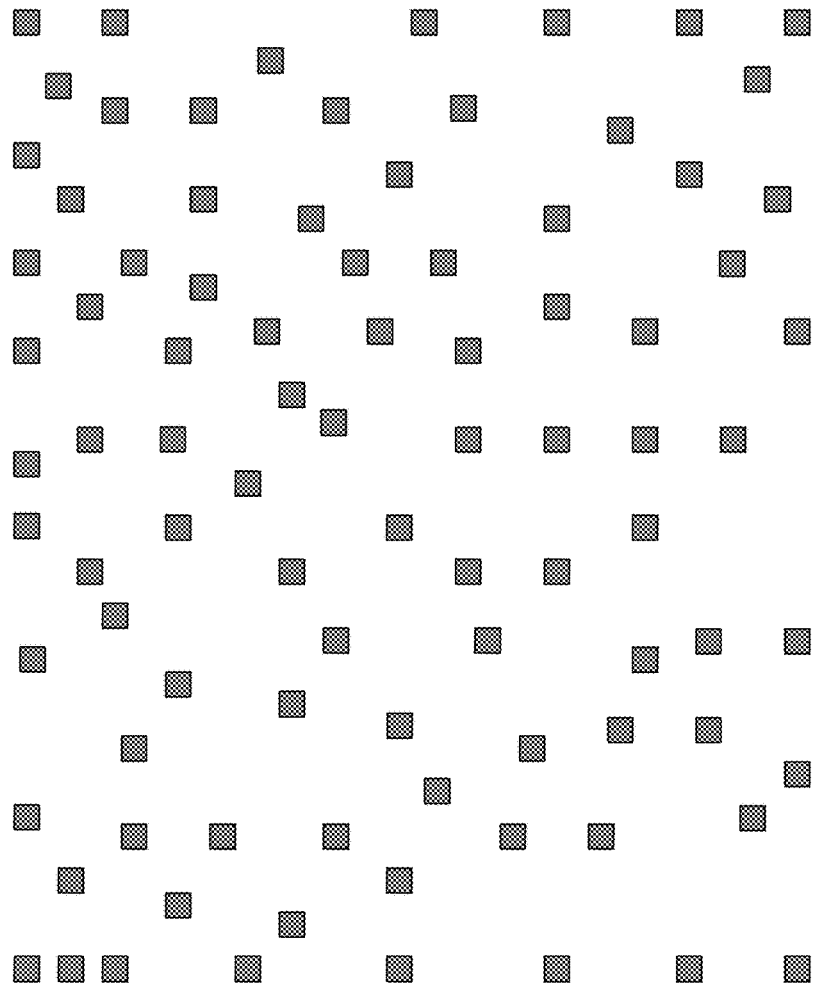
FIG. 5 illustrates an example schematic diagram of a watermark image according to an embodiment of the present disclosure.

The at least one encoding region may be one or more regions. When the at least one encoding region is one, a watermark image may be obtained according to the encoding region, that is, the watermark image may include only one encoding region. When the encoding region is multiple regions, the obtaining a watermark image according to the encoding region may comprise splicing a plurality of encoding regions to obtain a watermark image. A plurality of encoding regions may be used to form a watermark image, and the watermark information may be extracted from the remaining encoding regions even when a part of the encoding region is destroyed, as shown in FIG. 5.

As shown in FIG. 1, in block 108, the watermark image may be embedded in the carrier object.

When the watermark image generated in block 106 is embedded in the carrier object, the watermark image may be embedded as a background semi-transparent image of a carrier object (e.g., a document, or a web page) into the carrier object. As the background semi-transparent image is a layer of unrecognizable bitmap layer, and screen shot, or printing will carry the information of the bitmap layer, requirements of robustness can be met.

It should be noted that, since the watermark image includes the unique identification information of the user or the device, the unique identification information of the carrier object, or the current time information when the watermark information is embedded, the unique identification information can effectively prevent the watermark image from being forged and innocent parties from being framed.

For example, when a user accesses a webpage, and a watermark image is generated according to the current time information when the watermark information is embedded and the identity information of the user, if the current time unit is 30 seconds, when other users cannot copy-paste the watermark image to other web pages within 30 seconds, the user cannot be framed, thus effectively preventing other users from harming the user.

Another embodiment of the present disclosure may provide a watermark extracting method, which is described herein below with reference to FIG. 6.

Figure 6:
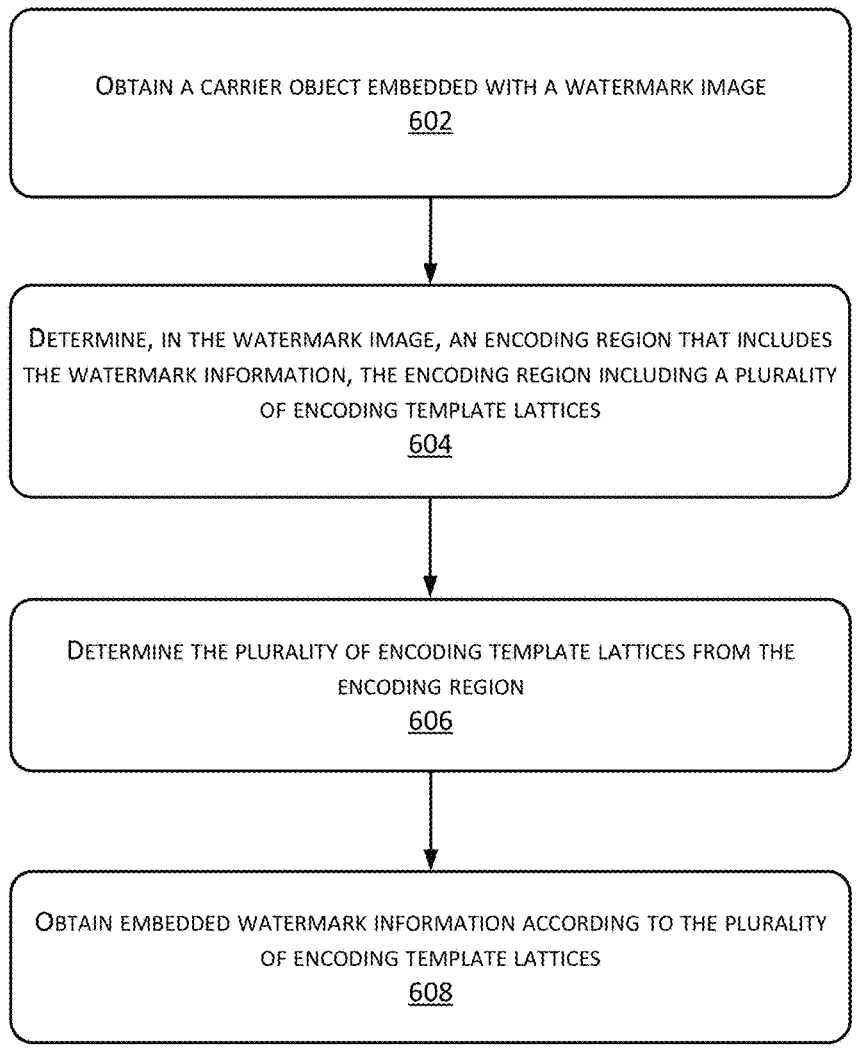
FIG. 6 illustrates an example flowchart of a watermark extracting method according to an embodiment of the present disclosure.

As shown in FIG. 6, in block 602, a carrier object embedded with a watermarked image may be obtained.

The carrier object may refer to a carrier object that has been embedded with a watermark image. The watermark image may refer to a dot matrix image containing watermark information.

As shown in FIG. 6, in block 604, an encoding region that includes the watermark information may be determined, the encoding region including a plurality of encoding template lattices.

The encoding region may include four positioning template lattices and multiple encoding template lattices. Three positioning template lattices and one encoding template lattice may be located in the upper left corner of the encoding region, in two by two template lattices, and one remaining encoding template lattice may be located in the lower right corner of the encoding region.

In embodiments, a positioning template lattice of the watermark image may be determined by performing extracting information of preset dots of the watermark image; comparing the information of the preset points with information of a preset positioning template lattices row by row and column by column; and if the information of the preset points is successfully matched with information of a preset positioning template lattices, determining that those preset points in the watermark image have been successfully matched as the positioning template lattices in the watermark image.

In embodiments, the encoding area according to the positioning template lattice may be determined by performing determining whether one of two by two template lattices at the corner areas connected to adjacent template lattices matches with three positioning template lattices and one encoding template lattice; determining one of two by two lattices as an upper left area of the encoding region in response to the one of two by two lattices matching with three positioning template lattices and an encoding template lattice; determining a rotation angle of the encoding region based on a location of the encoding template lattice; determining a location of the remaining positioning template lattice of the four positioning template lattices in the encoding region based on the rotation angle of the encoding region; and determining the area encompassing the four positioning template lattices and the plurality of encoding template lattices as the encoding region.

After determining the encoding region, the numbers and values of the positioning template lattices and the encoding template lattice may be determined according to the encoding region and the rotation angle of the encoding region.

The authentication template lattice may refer to a template lattice used to verify the encoded template lattice. The template lattice may be only divided into two types: positioning template lattice and encoding template lattice. Two of the four positioning template lattices in the encoding region may be randomly selected to participate in the scrambling of the encoding template lattice. The authentication template lattice may be applied to verify the encoding template lattice. Specifically, the positioning template lattices and the encoding template lattices have their respective encoded values, where the encoded values are hashed, and the results of the hashing are used for verification.

As shown in FIG. 6, in block 606, the plurality of encoding template lattices may be determined from the encoding region.

As shown in FIG. 6, in block 608, the embedded watermark information may be obtained according to the plurality of encoding template lattices.

In embodiments, the embedded watermark information may be obtained according to the encoding template lattices by performing computing a hash value based on an extracting key, information associated with random positioning template lattices and information associated with scrambled encoding template lattices; comparing the hash value with an authentication value; descrambling the scrambled encoding template lattices using the extracting key and the information associated with random positioning template lattices in response to the hash value matching the authentication value; and decoding information associated with the descrambled plurality of encoded template lattices to obtain the watermark information.

Corresponding to a watermark embedding method provided above, another embodiment of the present disclosure may further provide a watermark embedding apparatus 700.

Figure 7:
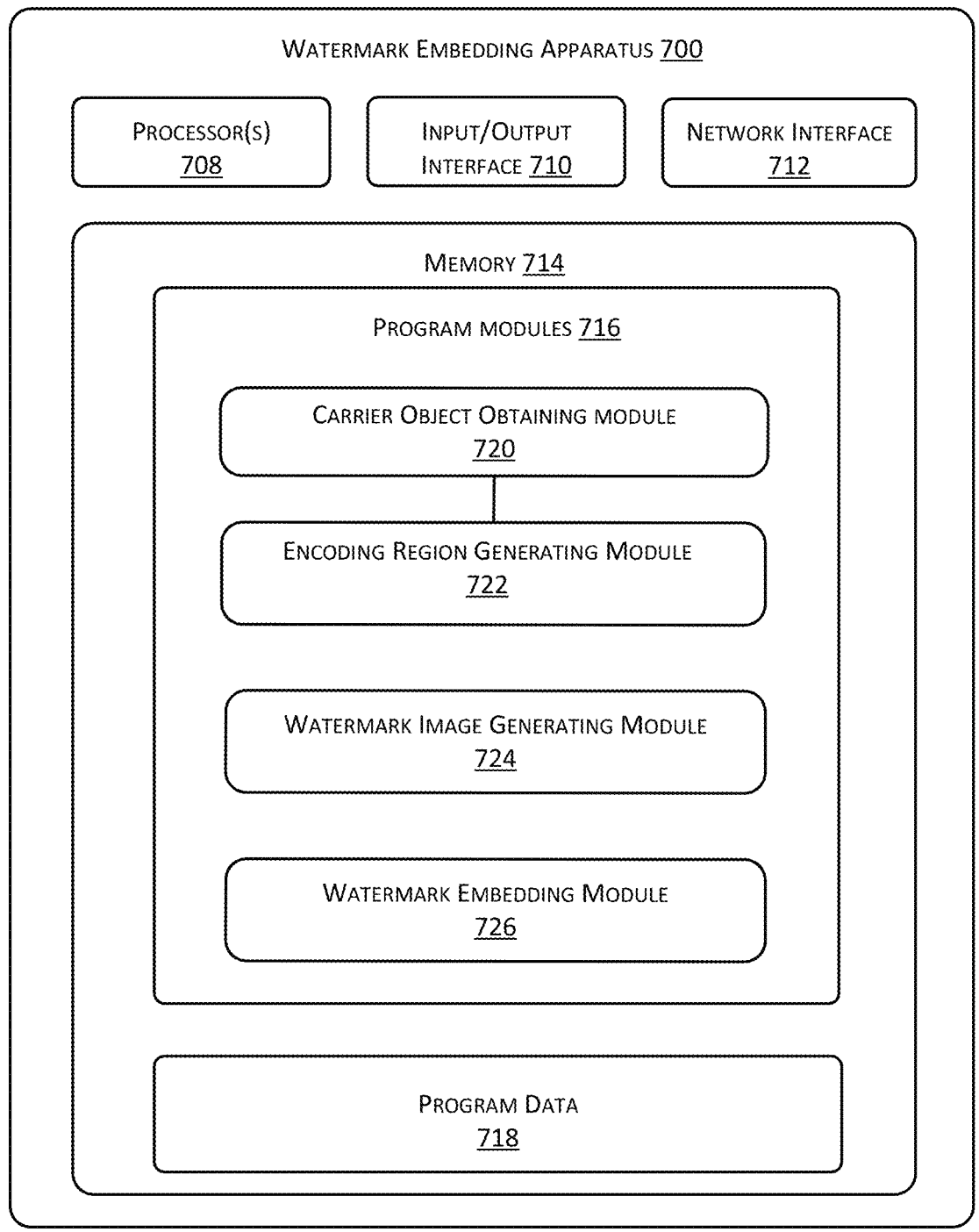
FIG. 7 illustrates an example schematic diagram of an electronic device for watermark embedding according to an embodiment of the present disclosure.

As shown in FIG. 7, the watermark embedding apparatus 700 may be implemented on a computing device. The watermark embedding apparatus 700 may include a carrier object obtaining module 720, configured to obtain a carrier object and watermark information to be embedded in the carrier object; an encoding region generating module 722, configured to generate, according to the watermark information, at least one encoding region that includes watermark information, the at least one encoding region including a plurality of template lattices; a watermark image generating module 724, configured to generate a watermark image according to the at least one encoding region; and a watermark image embedding module 726, configured to embed the watermark image into the carrier object.

In embodiments, the at least one encoding region may include a plurality of encoding regions, and the obtaining a watermark image according to the encoding region may further comprise splicing the plurality of encoding regions to obtain the watermark image.

In embodiments, the at least one encoding region may include a plurality of equal number of square lattices in length and width.

In embodiments, the plurality of template lattices may include preset dots, and a border spacing between adjacent template lattices is half of the spacing between the preset dots.

In embodiments, the plurality of template lattices may comprise a set of positioning template lattices and a set of encoding template lattices, the set of encoding template lattices including the watermark information.

In embodiments, the count of positioning template lattices in one encoding region may be four.

In embodiments, three positioning template lattices and an encoding template lattice may be disposed on a two by two lattice of an upper-left area of the at least one encoding region, and one remaining positioning template lattice may be disposed on a lattice of a lower-right area of the at least one encoding region.

In embodiments, a count of random positioning template lattices in the four positioning template lattices may be set.

In embodiments, the encoding region generating module 722 may be configured to further performing selecting the count of template lattices from the set of positioning template lattices; filling information associated with the count of template lattices to the random positioning template lattices of the at least one encoding region; coding the watermark information using the set of encoding template lattices to generate encoded template information; scrambling orders of lattices in the set of encoding template lattices using an embedding key and information associated with the count of random positioning template lattice; filling information associated with the scrambled lattices to at least part of the at least one encoding region in order; performing hash computation on the information associated with the count of random positioning template lattice and information associated with the set of encoding template lattices with scrambled order of lattices by using the embedding key; and filling results from the hash computation to unfilled encoding template lattices and positioning template lattices.

In embodiments, the watermark information may include at least one of identification information of a user or device, identification information of the carrier object, or present time stamp when the watermark information is embedded.

In embodiments, the watermark embedding apparatus 700 may further include one or more processors 708, an input/output (I/O) interface 710, a network interface 712, and memory 714.

The memory 714 may include a form of computer readable media such as a volatile memory, a random-access memory (RAM) and/or a non-volatile memory, for example, a read-only memory (ROM) or a flash RAM. The memory 714 is an example of a computer readable media.

The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

In embodiments, the memory 714 may include program modules 716 and program data 718. The program modules 716 may include one or more of the modules as described in the foregoing description.

Detailed description of content such as functions and technical effects of various functional modules involved in the watermark embedding apparatus of the present embodiment have been fully described in the foregoing embodiments, and the content thereof is still applicable to the present embodiment. Details thereof are not repeatedly described herein.

Figure 8:
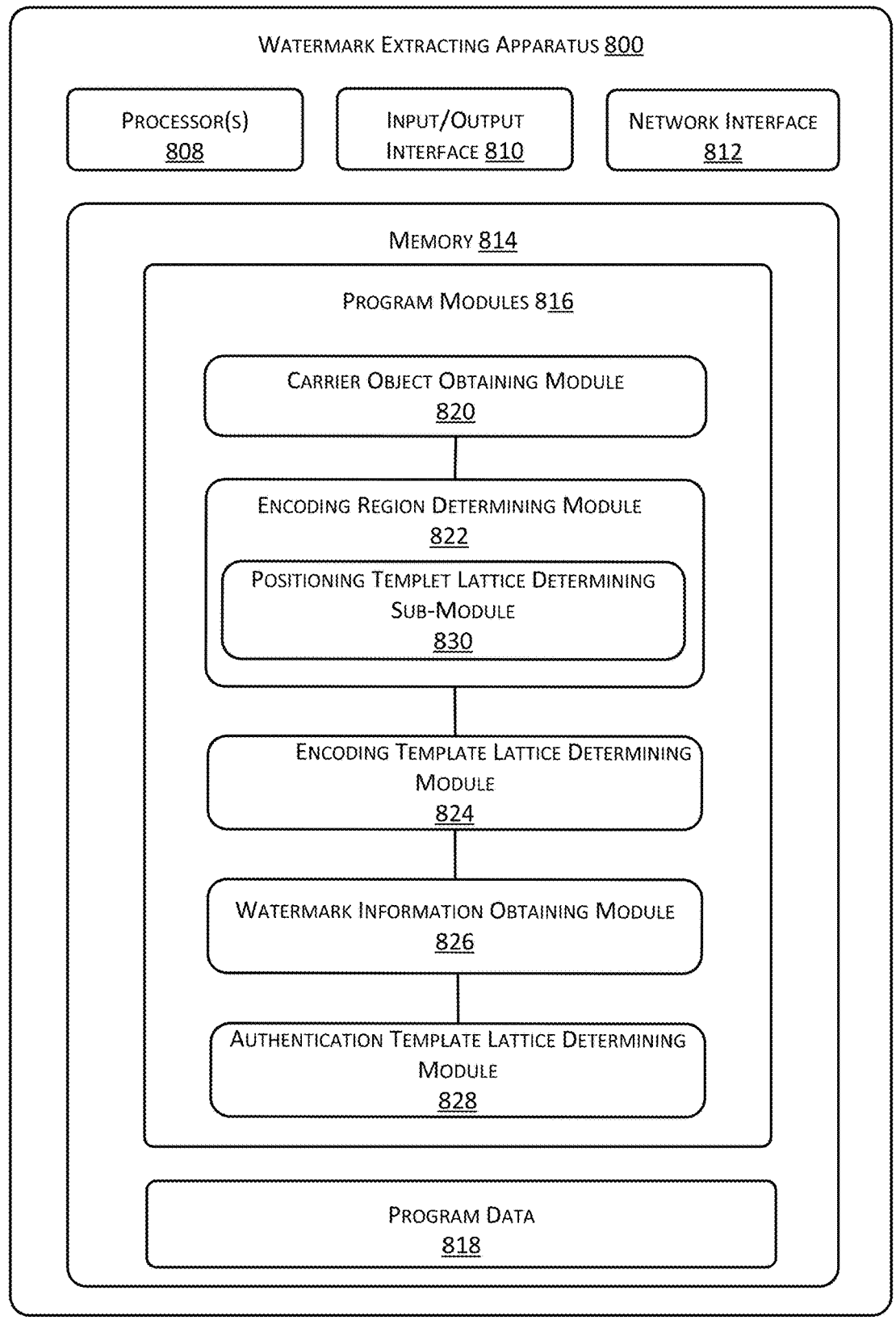
FIG. 8 illustrates an example schematic diagram of an electronic device for watermark extracting according to an embodiment of the present disclosure.

Corresponding to a watermark extraction method provided above, another embodiment of the present disclosure may further provide a watermark extraction apparatus 800, as shown in FIG. 8.

As shown in FIG. 8, the watermark extraction apparatus 800 may include a carrier object obtaining module 820, configured to obtain a carrier object embedded with a watermark image; an encoding region determining module 822, configured to determine an encoding region that includes the watermark information, the encoding region including an encoded template lattice; an encoding template lattice determining module 824, configured to determine an encoded template lattice in the encoding region; and a watermark information obtaining module 826, configured to obtain embedded watermark information according to the encoded template lattice.

In embodiments, the encoding region may further include positioning template lattices.

In embodiments, the plurality of template lattices may comprise four positioning template lattices and an encoding template lattice.

In embodiments, three positioning template lattices and the encoding template lattice may be disposed on a two by two lattice of an upper-left area of the at least one encoding region, and one remaining positioning template lattice may be disposed on a lattice of a lower-right area of the at least one encoding region.

In embodiments, the encoding region determining module 822 may comprise a positioning template lattice determining sub-module 830, configured to determine the encoding region according to the set of positioning template lattices.

In embodiments, the positioning template lattice determining sub-module may be configured to perform extracting information associated with a predetermined set of template lattices in the watermark image; comparing the information associated with the predetermined set of template lattices to a predetermined set of positioning template lattices; and determining the predetermined set of positioning template lattices as the set of positioning template lattices in the watermark image in response to the predetermined set of template lattices matching the predetermined set of positioning template lattices.

In embodiments, the encoding region determining module 822 may be configured to further perform determining whether one of two by two lattices disposed on corners of the plurality of encoding template lattices matches with three positioning template lattices and an encoding template lattice; determining one of two by two lattices as an upper-left area of the encoding region in response to the one of two by two lattices matches with three positioning template lattices and an encoding template lattice; determining a rotation angle of the encoding region based on a location of the encoding template lattice; determining a location of the remaining positioning template lattice of the four positioning template lattices in the encoding region based on the rotation angle of the encoding region; and determining the area encompassing the four positioning template lattices and the plurality of encoding template lattices as the encoding region.

In embodiments, the watermark extraction apparatus 800 may further include an authentication template lattice determining module 828, configured to determine numbers and values associated with the lattices in the four positioning template lattices and the plurality of encoding template lattices based on the encoding region and the rotation angles of the encoding region.

In embodiments, the watermark information obtaining module 826 may be further configured to perform computing a hash value based on an extracting key, information associated with random positioning template lattices and information associated with scrambled plurality of encoded template lattices; comparing the hash value with an authentication value; descrambling the scrambled plurality of encoded template lattices using the extracting key and the information associated with random positioning template lattices in response to the hash value matching the authentication value; and decoding information associated with the descrambled plurality of encoded template lattices to obtain the watermark information.

In embodiments, the watermark extracting apparatus 800 may further include one or more processors 808, an input/output (I/O) interface 810, a network interface 812, and memory 814.

The memory 814 may include a form of computer readable media such as a volatile memory, a random-access memory (RAM) and/or a non-volatile memory, for example, a read-only memory (ROM) or a flash RAM. The memory 814 is an example of a computer readable media.

The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

In embodiments, the memory 814 may include program modules 816 and program data 818. The program modules 816 may include one or more of the modules as described in the foregoing description.

Detailed description of content such as functions and technical effects of various functional modules involved in the watermark extracting apparatus of the present embodiment have been fully described in the foregoing embodiments, and the content thereof is still applicable to the present embodiment. Details thereof are not repeatedly described herein.

It should be understood that the watermark embedding apparatus 700 and the watermark extracting apparatus 800 as illustrated in FIG. 7 and FIG. 8 are for illustration purpose. The present disclosure is not intended to be limiting. The watermark embedding apparatus 700 and the watermark extracting apparatus 800 may be implemented on a same computing device. The one or more processors 708 and 808 may be deployed separately or integrated together, the input/output (I/O) interface 710 and 810 may be deployed separately or integrated together into one interface, and the network interface 712 and 812 may be deployed separately or integrated into one interface. The watermark embedding apparatus 700 and the watermark extracting apparatus 800 may share a same storage space, and thus, memory 714 and 814 may be deployed separately or integrated together into one memory.

Corresponding to the watermark embedding method provided above, an embodiment of the present disclosure may further provide a storage device that stores a program for watermark embedding. Then program, when executed by a processor, may cause the processor to perform obtaining a carrier object and watermark information to be embedded in the carrier object; generating at least one encoding region including the watermark information according to the watermark information, the at least one encoding region including a plurality of template lattices; obtaining a watermark image according to the at least one encoding region; and embedding the watermark image in the carrier object. The storage device that stores a program for watermark embedding may be implemented by the memory 714, as shown in FIG. 7.

Corresponding to the watermark extracting method provided above, another embodiment of the present disclosure may further provide a storage device that stores a program for watermark extracting. Then program, when executed by a processor, may cause the processor to perform obtaining a carrier object embedded with a watermark image; determining, in the watermark image, an encoding region that includes the watermark information, the encoding region including a plurality of encoding template lattices; determining the plurality of encoding template lattices from the encoding region; and obtaining embedded watermark information according to the plurality of encoding template lattices. The storage device that stores a program for watermark extracting may be implemented by the memory 814, as shown in FIG. 8.

Another embodiment of the present disclosure may provide a watermark embedding method implemented on a watermark server. The method according to the embodiment is described in detail herein in conjunction with FIG. 9.

Figure 9:
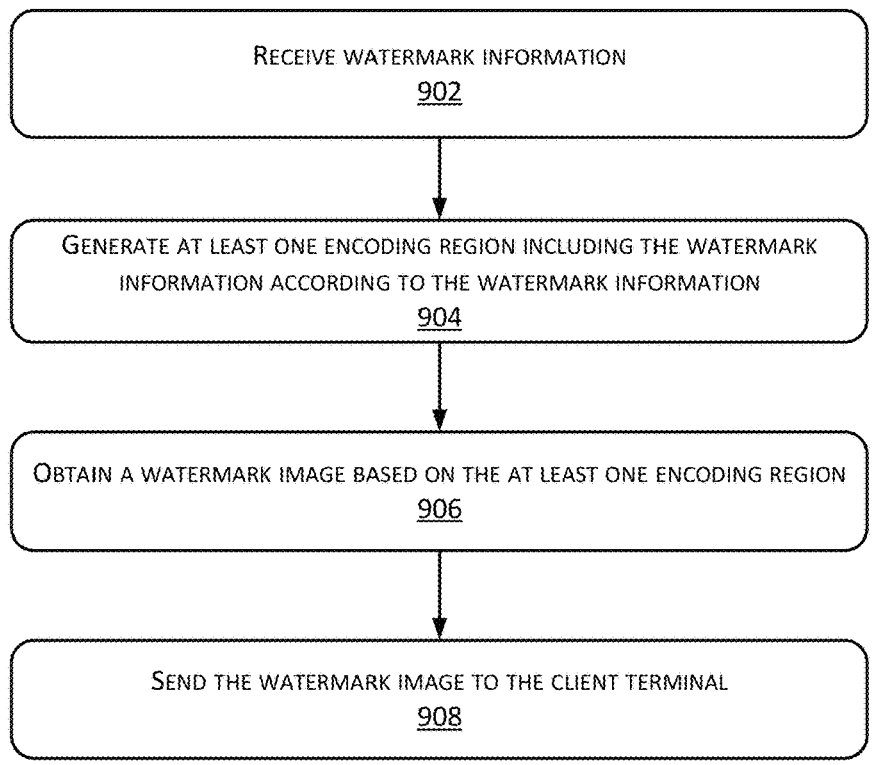
FIG. 9 illustrates an example flowchart of a watermark embedding method according to an embodiment of the present disclosure.

As shown in FIG. 9, in block 902, the watermark information may be received.

In embodiments, receiving the watermark information may include receiving the watermark information sent by a client terminal; or, receive the watermark information sent by a service server.

The client terminal may interact directly with the watermark server or through the service server. If the client terminal interacts with the watermark server through the service server, the client terminal may first send a service request for embedding the watermark to the service server, and the service server may further send the watermark information to the watermark server after receiving the request.

As shown in FIG. 9, in block 904, at least one encoding region including watermark information may be generated according to the watermark information, the encoding region including a plurality of template lattices.

The at least one encoding region may include a plurality of equal number of square lattices in length and width. For example, the encoding region includes 5*5 square template lattices, as shown in FIG. 2.

The plurality of template lattices may include preset dots. Spacings between the preset dots in each template lattice are equal, and a spacing distance between borders of the template lattices is half of the spacings between the present dots. The purpose is to keep all the preset dots spacings consistent after the splicing of multiple template lattices, so as to ensure that when an encoding area is randomly intercepted, the starting position and the splicing position cannot be separately identified. The preset dot may refer to a point in the template lattice into which the information can be filled.

The plurality of template lattices may include a set of positioning template lattices and a set of encoding template lattices, the encoding template lattice including the watermark information. The positioning template lattices may refer to the template lattices used to determine the position of the encoding region.

In embodiments, the count of positioning template lattices in one encoding region may be four.

When the encoding region includes four positioning template lattices and an encoding template lattice, the four positioning template lattices and the encoding template lattice may be arranged in the following manner: three positioning template lattices and one encoding template lattice may be located on the upper left area of the encoding region, an angular two by two template lattice region; the remaining one positioning template lattice may be located in the lower right area of the encoding region. As shown in FIG. 2, the encoding region includes 5*5 template lattices, where 4 template lattices are fixed positioning template lattices, and the remaining 21 are encoded template lattices.

A count of positioning template lattices in the four positioning template lattices may be preset as random positioning template lattices.

In embodiments, the method of watermark embedding may further include selecting a preset count of template lattices from the set of positioning template lattices; filling information associated with the selected preset count of template lattices into the random positioning template lattices in the encoding region; encoding the watermark information using a preset encoding template lattice to generate encoded template lattices; chaotically scrambling the order of the encoding template lattices by using the embedding key and the information associated with the preset count of random positioning templates; sequentially padding the scrambled encoded template lattices into the encoding region; performing a hash computation on the scrambled encoding template lattices using the embedding key and information associated with the preset random positioning template lattices; and filling the hash computation results into the remaining encoding template lattices and the remaining positioning template lattices.

In embodiments, generating at least one encoding region including watermark information according to the watermark information may further include selecting a preset count of template lattices from the set of positioning template lattices, and filling information associated with the selected preset count of template lattices into the positions of the random positioning template lattices in the encoding region; encoding the watermark information by using a preset encoding template lattices to obtain encoded template information; performing chaotic scrambling on the order of the encoded template lattices by using the embedding key and information associated with the preset count of random positioning template lattices; filling information associated with the scrambled encoded template lattices successively into the encoding region; performing hash computation on the scrambled encoded template lattices using the embedding key and information associated with the preset random positioning template lattices; and filling the hash computation results into the remaining encoding template lattices and the remaining positioning template lattices.

In embodiments, the embedding key may be obtained by receiving the embedding key sent by the service server.

The preset positioning template lattices may refer to a set of positioning template lattices that are predetermined. The preset encoding template lattice may refer to a set of encoding template lattices that are predetermined. Each template lattice may be square. The preset dots in each template lattice may be different. The type of template lattice may not change when the template lattice rotates 0, 90, 180, or 270 degrees such that even if the template lattice is rotated, the type of template lattice may not be determined to be a different type, and watermark information can still be correctly extracted. For example, a positioning template lattice is still a positioning template lattice after rotating 0, 90, 180, or 270 degrees. The corresponding value may be different, but the type of the template lattice is not determined to be an encoding template lattice. Similarly, an encoding template lattice is still an encoding template lattice after rotating 0, 90, 180, or 270 degrees. The corresponding value may be different, but the type of the template lattice is not determined to be a positioning template lattice.

As shown in FIG. 9, in block 906, a watermark image may be obtained based on the at least one encoding region.

The at least one encoding region may be one or more regions. When the at least one encoding region is one, a watermark image may be obtained according to the encoding region, that is, the watermark image may include only one encoding region. When the encoding region is multiple regions, the obtaining a watermark image according to the encoding region may comprise splicing a plurality of encoding regions to obtain a watermark image. A plurality of encoding regions may be used to form a watermark image, and the watermark information may be extracted from the remaining encoding regions even when a part of the encoding region is destroyed, as shown in FIG. 5.

As shown in FIG. 9, in block 908, the watermark image may be sent to the client terminal.

In addition to returning the watermark image to the client terminal, a character string corresponding to the watermark image may be returned to the client terminal. A bit sequence corresponding to the watermark image may be obtained first based on whether the preset dots of the watermark image are filled. The character string may be further determined based on the bit sequence. Sending the watermark image to the client terminal may include returning the character string corresponding to the watermark image to the client terminal. By adopting the method of returning the character string corresponding to the watermark image to the client terminal, the concealment of the data being transmitted can be improved, data volume being transmitted can be reduced, thereby providing the concurrency of the watermark service.

In embodiments, obtaining, according to the bit sequence, a character string corresponding to the bit sequence may further include converting the bit sequence to a byte array; and encoding the byte array to obtain the character string using base 64 encoding scheme.

Another embodiment of the present disclosure may provide a watermark embedding method implemented on a client terminal. The method according to the embodiment is described in detail herein in conjunction with FIG. 10.

Figure 10:
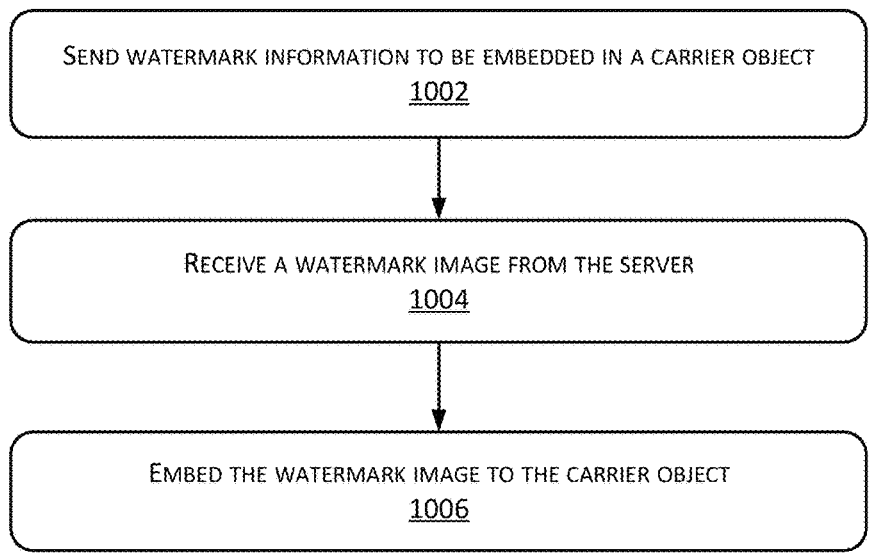
FIG. 10 illustrates an example flowchart of a watermark embedding method according to an embodiment of the present disclosure.

As shown in FIG. 10, in block 1002, watermark information to be embedded in a carrier object may be sent.

As shown in FIG. 10, in block 1004, a watermark image may be received. Receiving the watermark image may include receiving the watermark image itself and receiving the character string corresponding to the watermark image.

In embodiments, the character string corresponding to the watermark image may be obtained by performing obtaining a bit sequence corresponding to the watermark image according to whether the preset dots of the watermark image are filled; and obtaining a character string corresponding to the bit sequence according to the bit sequence.

In embodiments, obtaining, according to the bit sequence, a character string corresponding to the bit sequence may include converting the bit sequence to a byte array; and encoding the byte array to obtain the character string using base 64 encoding scheme.

As shown in FIG. 10, in block 1006, the watermark image may be embedded in the carrier object.

If the client terminal receives the watermark image itself, the watermark image may be directly embedded into the carrier object. If the character string corresponding to the watermark image is received, the character string may be needed to be decoded to generate a corresponding bit sequence, and the watermark image may be obtained by filling the preset dots of the watermark image according to the bit sequence.

Figure 11:
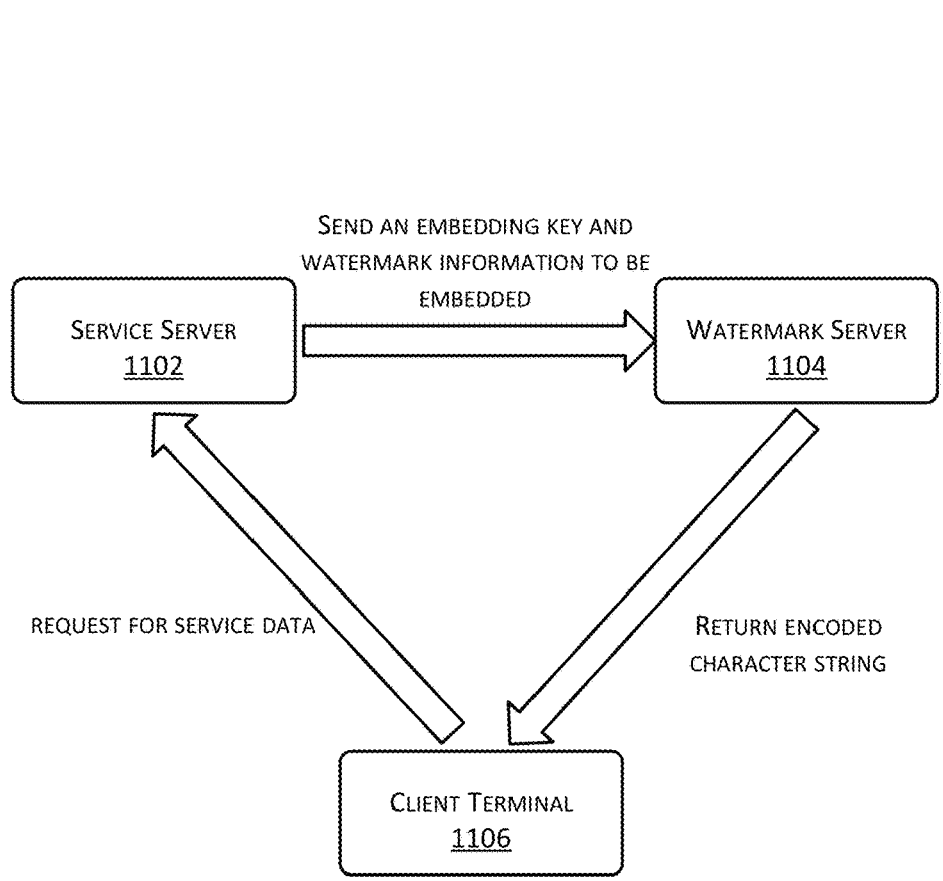
FIG. 11 illustrates an example interaction diagram of the watermark server, the service server, and the client terminal according to an embodiment of the present disclosure.

FIG. 11 illustrates an example interaction diagram of the watermark server 1104, the service server 1102, and the client terminal 1106 according to an embodiment of the present disclosure.

First, the client terminal 1106 may submit the embedded watermark service request to the service server 1102, and the service server 1102 may determine the watermark information that needs to be embedded and send it together with an embedding key to the watermark server 1104 to apply for the watermark. Further, the watermark server 1104 may generate a watermark image, according to whether the preset dots in the watermark image are filled to obtain a sequence of 0 and 1. The watermark server 1104 may convert the sequence of 0 and 1 into a byte array, and then encode the byte array using base 64 encoding scheme to obtain a character string, and return the character string to the client terminal 1106. After decoding the character string, the client terminal 1106 may fill the preset dots in the watermark image according to the sequence of 0 and 1 to obtain a watermark image. Finally, the background may be drawn on a computer terminal to obtain an unrecognizable watermark layer.

Another embodiment of the present disclosure may provide a watermark extracting method implemented on a client terminal. The method according to the embodiment is described herein in conjunction with FIG. 12.

Figure 12:
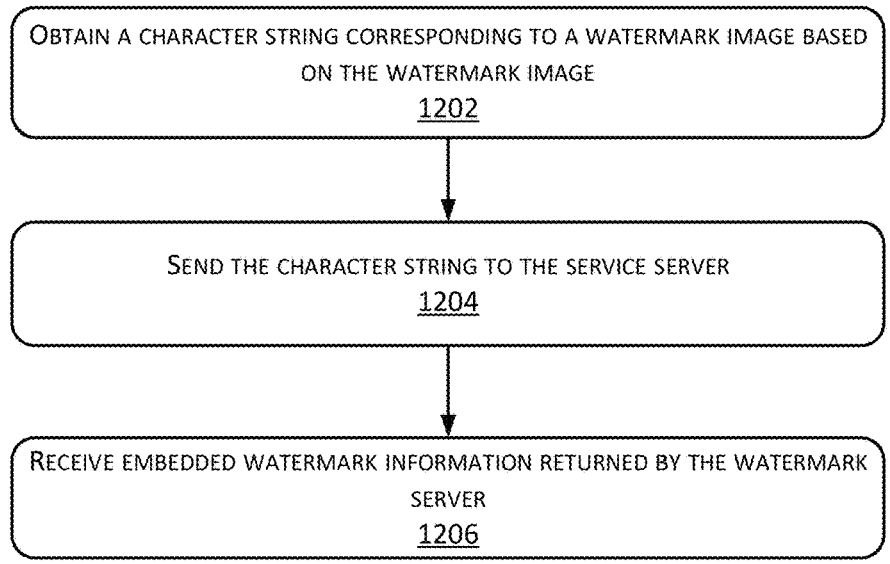
FIG. 12 illustrates an example flowchart of a method of extracting a watermark according to an embodiment of the present disclosure.

As shown in FIG. 12, in block 1202, a character string corresponding to the watermark dot image may be obtained based on the watermark image.

The character string corresponding to the watermark image may be obtained by performing obtaining a bit sequence corresponding to the watermark image according to whether the preset dots of the watermark image are filled; and obtaining a character string corresponding to the bit sequence according to the bit sequence.

In embodiments, obtaining, according to the bit sequence, a character string corresponding to the bit sequence may include converting the bit sequence to a byte array; and encoding the byte array to obtain the character string using base 64 encoding scheme.

As shown in FIG. 12, in block 1204, the character string may be sent to the service server.

As shown in FIG. 12, in block 1206, the embedded watermark information returned by the watermark server may be received.

Another embodiment of the present disclosure may provide a watermark extracting method implemented on a watermark server. The method according to the embodiment is described herein in conjunction with FIG. 13.

Figure 13:
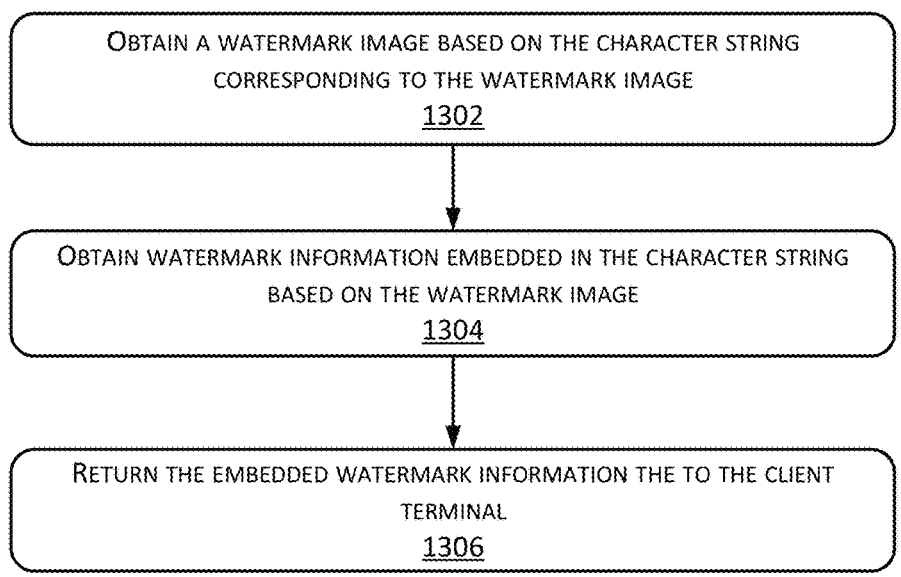
FIG. 13 illustrates an example flowchart of a method of extracting a watermark according to another embodiment of the present disclosure.

As shown in FIG. 13, in block 1302, a watermark image may be obtained based on the character string corresponding to the watermark image.

As shown in FIG. 13, in block 1304, embedded watermark information may be obtained based on the watermark image.

Specific process of obtaining the embedded watermark information according to the watermark image may refer to descriptions of blocks 602-608, as illustrated in FIG. 6.

As shown in FIG. 13, in block 1306, the embedded watermark information may be returned to the client terminal.

Figure 14:
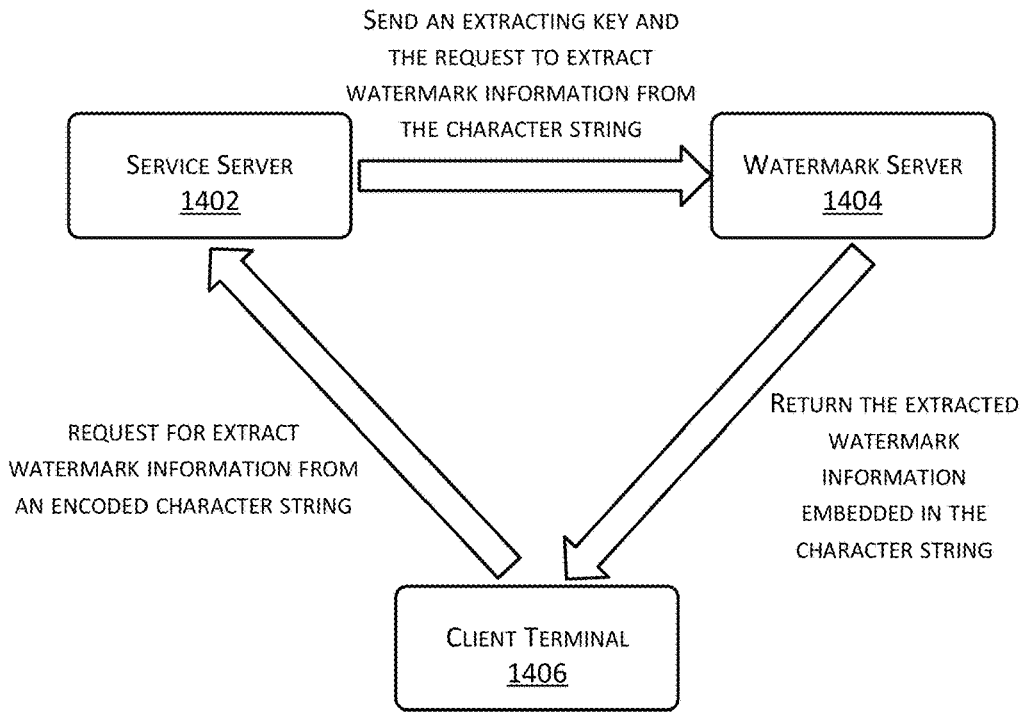
FIG. 14 illustrates an example interaction diagram of the watermark server, the service server, and the client terminal according to another embodiment of the present disclosure.

FIG. 14 illustrates an example interaction diagram of the watermark server 1404, the service server 1402, and the client terminal 1406 according to another embodiment of the present disclosure.

First, the client terminal 1406 may interpret the watermark image, and obtain a character string corresponding to the watermark; then the client terminal 1406 may send the character string corresponding to the watermark image to the service server 1402. The service server 1402 may send the embedding key and the character string corresponding to the watermark image to the watermark server 1404. The watermark server 1404 may convert the character string corresponding to the watermark image to a sequence of 0 and 1 and fill the preset dots of the watermark image according to the sequence of 0 and 1 to obtain the watermark image. The watermark server 1404 may further obtain the embedded watermark information according to the watermark image and return the watermark information to the client terminal.

The present disclosure is described in the above embodiments, but the present disclosure is not intended to be limiting. Any person skilled in the art can make possible changes and modifications without departing from the spirit and scope of the present disclosure. The scope of protection shall be subject to the scope defined by the claims of the present disclosure.

In embodiments, a computing device may include one or more processors (CPUs), input/output interfaces, network interfaces, and memory.

The memory may include non-persistent memory, random access memory (RAM), and/or non-volatile memory in a computer readable medium such as read only memory (ROM) or flash memory. Memory is an example of a computer readable medium.

The computer readable storage medium may be a tangible device that is configured to maintain and store the instructions used by the instruction execution device. The computer readable storage medium may be, for example, but not limited to, an electrical storage device, a magnetic storage device, an optical storage device, an electromagnetic storage device, a semiconductor storage device, or any suitable combination of the foregoing. More specific examples (non-exhaustive lists) of computer readable storage media may include: portable computer disks, hard disks, random access memory (RAM), read only memory (ROM), erasable programmable read only memory (EPROM or flash memory), static random access memory (SRAM), portable compact disk read only memory (CD-ROM), digital versatile disk (DVD), memory stick, floppy disk, mechanical encoding device, for example, a punched card or a protruding structure within a groove with instructions stored thereon, and any suitable combinations of the above. A computer readable storage medium as used herein is not to be interpreted as a transient signal itself, such as a radio wave or other free propagating electromagnetic wave, an electromagnetic wave propagating through a waveguide or other transmission medium (e.g., a light pulse through a fiber optic cable), or an electrical signal transmitted through a wire.

Aspects of the present disclosure are described herein with reference to flowchart illustrations and/or schematic diagrams of methods, devices, and computer program products according to embodiments of the present disclosure. It should be understood for those of ordinary skilled in the art that the flowcharts and/or the schematic diagrams, and the combinations of one or more blocks of the flowcharts and/or the schematic diagrams, may be implemented by computer readable program instructions.

The computer readable program instructions may be provided to a general purpose computer, a special purpose computer, or a processor of other programmable data processing apparatus, and when executed by a processor of a computer or other programmable data processing apparatus, the computer readable program instructions may generate means that implements the functions/acts specified in one or more blocks of the flowcharts and/or the schematic diagrams.

The computer readable program instructions may also be stored in a computer readable storage medium that causes the computer, programmable data processing device, and/or other device to operate in a specific manner. The computer readable medium storing the instructions may include an article of manufacture, which comprises various aspects of the instructions to implement the functions/acts specified in one or more blocks of the flowcharts and/or the schematic diagrams.

Computer readable program instructions may also be loaded onto a computer, other programmable data processing device, or other device to perform a series of operational steps to produce a computer-implemented process. Thus, computer readable program instructions executed on a computer, other programmable data processing apparatus, or other device may implement the functions/acts specified in one or more blocks of the flowcharts and/or the schematic diagrams.

The flowcharts and schematic diagrams in the figures illustrate the architecture, functionality and operation of various implementations of systems, methods and computer program products according to various embodiments of the present disclosure. In this regard, each block in the flowchart or the schematic diagram may represent a module, a program segment, or a portion of an instruction, which include one or more executable instructions to implement the specified logic functions. In some alternative implementations, the functions specified in the blocks of a flowchart or a schematic diagram may be performed in a different order than those illustrated in the drawings. For example, two consecutive blocks of a flowchart or a schematic diagram may be executed substantially in parallel or in a reverse order, depending on the functionality being involved. It is also noted that each block and the combinations of the blocks of the flowcharts and/or the schematic diagrams may be implemented by hardware-based systems dedicated to performing specified functions or acts, or a combination of the hardware-based systems and the computer instructions.

The embodiments of the present disclosure described above are merely for illustration purpose and are non-exhaustive and not intended to be limiting. Numerous modifications and variations may be apparent to those of ordinary skilled in the art without departing from the scope of the invention. The choice of terms used herein is intended to best explain the principles, practical applications, or technical improvements of the techniques in the market, or to facilitate those of ordinary skill in the art to understand the embodiments disclosed herein.

Example Clauses

A. A method comprising: obtaining a carrier object and watermark information to be embedded in the carrier object; generating at least one encoding region including the watermark information according to the watermark information, the at least one encoding region including a plurality of template lattices; obtaining a watermark image according to the at least one encoding region; and embedding the watermark image in the carrier object.

B. The method as recited in paragraph A, wherein: the at least one encoding region includes a plurality of encoding regions, and the obtaining a watermark image according to the encoding region may further comprise: splicing the plurality of encoding regions to obtain the watermark image.

C. The method as recited in paragraph A, wherein: the at least one encoding region includes a plurality of equal number of square lattices in length and width.

D. The method as recited in paragraph A, wherein: the plurality of template lattices comprises a set of positioning template lattices and an encoding template lattice, the encoding template lattices including the watermark information.

E. The method as recited in paragraph A, wherein: the plurality of template lattices comprise four positioning template lattices and the encoding template lattice, wherein: three positioning template lattices and the encoding template lattice are placed on two by two template lattices at upper left of the at least one encoding region, and one remaining positioning template lattice is placed on a template lattice at lower right of the at least one encoding region.

F. A method as recited in paragraph E, further comprising: setting a count of positioning template lattices in the four positioning template lattices as random positioning template lattices.

G. The method as recited in paragraph F, wherein the generating at least one coding region including the watermark information according to the watermark information may further comprise: selecting the count of template lattices from the set of positioning template lattices; filling information associated with the count of template lattices to the random positioning template lattices of the at least one encoding region; encoding the watermark information using the set of encoding template lattices to generate encoded template lattices; scrambling orders of the encoded template lattices using an embedding key and information associated with the count of random positioning template lattice; filling information associated with the scrambled encoded template lattices into at least part of the at least one encoding region in order; performing hash computation on the information associated with the count of random positioning template lattices and information associated with the scrambled encoded template lattices by using the embedding key; and filling results from the hash computation to unfilled encoding template lattices and positioning template lattices.

H. The method as recited in paragraph A, wherein: the watermark information includes at least one of: identification information of a user or device, identification information of the carrier object, or present time stamp when the watermark information is embedded.

I. A method comprising: obtaining a carrier object embedded with a watermark image; determining, in the watermark image, an encoding region that includes the watermark information, the encoding region including a plurality of encoded template lattices; determining the plurality of encoded template lattices from the encoding region; and obtaining watermark information embedded in the carrier object according to the plurality of encoded template lattices.

J. The method as recited in paragraph I, wherein: the encoding region comprises four positioning template lattices and an encoding template lattice, wherein: three positioning template lattices and the encoding template lattice are disposed on a two by two template lattices at upper left of the encoding region, and one remaining positioning template lattice is disposed on a template lattice at lower right of the encoding region.

K. The method as recited in paragraph J, wherein: the determining, in the watermark image, an encoding region that includes the watermark information may further comprise: determining a set of positioning template lattices in the watermark image; and determining the encoding region according to the set of positioning template lattices.

L. The method as recited in paragraph K, wherein: the determining a set of positioning template lattices in the watermark image may further comprise: extracting information associated with preset dots in the watermark image; comparing the information associated with the preset dots in the watermark image to information associated with a set of positioning template lattices; and when the information associated with the preset dots in the watermark image matches to information associated with a set of positioning template lattices, determining the set of positioning template lattices as included in the watermark image.

M. The method as recited in paragraph L, wherein: the determining the encoding region according to the set of positioning template lattices may further comprise: determining whether one of two by two template lattices at corners of the encoding region matches with three positioning template lattices and an encoding template lattice; when whether one of two by two template lattices at corners of the encoding region matches with three positioning template lattices and an encoding template lattice, determining one of two by two template lattices as located at upper left of the encoding region; determining a rotation angle of the encoding region based on a location of the encoding template lattice; determining a location of the remaining positioning template lattices of the four positioning template lattices in the encoding region based on the rotation angle of the encoding region; and determining the area encompassing the four positioning template lattices and the encoding template lattice as the encoding region.

N. The method as recited in paragraph M, further comprising: determining numbers and values associated with the four positioning template lattices and the encoding template lattice based on the encoding region and the rotation angle of the encoding region.

O. The method as recited in paragraph N, wherein the obtaining embedded watermark information according to the plurality of encoded template lattices may further comprise: computing a hash value based on an extracting key, information associated with random positioning template lattices and information associated with scrambled encoded template lattices; comparing the hash value with an authentication value; descrambling the scrambled encoded template lattices using the extracting key and the information associated with random positioning template lattices in response to the hash value matching the authentication value; and decoding information associated with the descrambled encoded template lattices to obtain the watermark information.

P. A computing device comprising: one or more processors, and memory communicatively coupled to the one or more processors, the memory storing computer-executable instructions that when executed by the one or more processors, causing the one or more processors to perform operations including: obtaining a carrier object and watermark information to be embedded in the carrier object; generating at least one encoding region including the watermark information according to the watermark information, the at least one encoding region including a plurality of template lattices; obtaining a watermark image according to the at least one encoding region; and embedding the watermark image in the carrier object.

Q. The computing device as recited in paragraph P, wherein: the plurality of template lattices comprise four positioning template lattices and an encoding template lattice, wherein: three positioning template lattices and the encoding template lattice are placed on two by two template lattices at upper left of the at least one encoding region, and one remaining positioning template lattice is placed on a template lattice at lower right of the at least one encoding region.

R. The computing device as recited in paragraph Q, wherein the computer-executable instructions that, when executed by the one or more processors, causing the one or more processors to perform further operations including: setting a count of positioning template lattices in the four positioning template lattices as random positioning template lattices; selecting the count of template lattices from the set of positioning template lattices; filling information associated with the count of template lattices to the random positioning template lattices of the at least one encoding region; encoding the watermark information using the set of encoding template lattices to generate encoded template lattices; scrambling orders of the encoded template lattices using an embedding key and information associated with the count of random positioning template lattice; filling information associated with the scrambled encoded template lattices into at least part of the at least one encoding region in order; performing hash computation on the information associated with the count of random positioning template lattices and information associated with the scrambled encoded template lattices by using the embedding key; and filling results from the hash computation to unfilled encoding template lattices and positioning template lattices.

S. The computing device as recited in paragraph P, wherein: the watermark information includes at least one of: identification information of a user or device, identification information of the carrier object, or present time stamp when the watermark information is embedded.

T. A computer-readable storage medium storing computer-readable instructions that when executed by the one or more processors, cause the one or more processors to perform operations comprising: obtaining a carrier object and watermark information to be embedded in the carrier object; generating at least one encoding region including the watermark information according to the watermark information, the at least one encoding region including a plurality of template lattices; obtaining a watermark image according to the at least one encoding region; and embedding the watermark image in the carrier object.

U. The computer-readable storage medium as recited in paragraph T, wherein: the at least one encoding region includes a plurality of encoding regions, and the obtaining a watermark image according to the encoding region may further comprise: splicing the plurality of encoding regions to obtain the watermark image.

V. The computer-readable storage medium as recited in paragraph T, wherein: the at least one encoding region includes a plurality of equal number of square lattices in length and width.

W. The computer-readable storage medium as recited in paragraph T, wherein: the plurality of template lattices comprises a set of positioning template lattices and a set of encoding template lattices, the set of encoding template lattices including the watermark information.

X. The computer-readable storage medium as recited in paragraph T, wherein: the plurality of template lattices comprise four positioning template lattices and an encoding template lattice, wherein: three positioning template lattices and the encoding template lattice are placed on two by two template lattices at upper left of the at least one encoding region, and one remaining positioning template lattice is placed on a template lattice at lower right of the at least one encoding region.

Y. A computer-readable storage medium as recited in paragraph X, wherein the instructions when executed by the one or more processors, cause the one or more processors to further perform: setting a count of positioning template lattices in the four positioning template lattices as random positioning template lattices.

Z. The A computer-readable storage medium as recited in paragraph Y, wherein the generating at least one coding region including the watermark information according to the watermark information may further comprise: selecting the count of template lattices from the set of positioning template lattices; filling information associated with the count of template lattices to the random positioning template lattices of the at least one encoding region; encoding the watermark information using the set of encoding template lattices to generate encoded template lattices; scrambling orders of the encoded template lattices using an embedding key and information associated with the count of random positioning template lattice; filling information associated with the scrambled encoded template lattices into at least part of the at least one encoding region in order; performing hash computation on the information associated with the count of random positioning template lattices and information associated with the scrambled encoded template lattices by using the embedding key; and filling results from the hash computation to unfilled encoding template lattices and positioning template lattices.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
    obtaining a carrier object and watermark information to be embedded in the carrier object;
    generating at least one encoding region including the watermark information according to the watermark information, the at least one encoding region including a plurality of template lattices, and the plurality of template lattices comprising a plurality of positioning template lattices and one or more encoding template lattices;
    obtaining a watermark image according to the at least one encoding region; and
    embedding the watermark image in the carrier object.

2. The method according to claim 1, wherein the at least one encoding region includes a plurality of encoding regions, and the obtaining a watermark image according to the encoding region may further comprise:
    splicing the plurality of encoding regions to obtain the watermark image.

3. The method according to claim 1, wherein the at least one encoding region includes a plurality of equal number of square lattices in length and width.

4. The method according to claim 1, wherein the one or more encoding template lattices comprise the watermark information.

5. The method according to claim 4, wherein the plurality of positioning template lattices comprise four positioning template lattices, and the one or more encoding template lattices comprise one encoding template lattice, wherein:
    three positioning template lattices and the one encoding template lattice are placed on two by two template lattices at upper left of the at least one encoding region, and one remaining positioning template lattice is placed on a template lattice at lower right of the at least one encoding region.

6. The method according to claim 1, further comprising:
    setting a count of positioning template lattices in the plurality of positioning template lattices as random positioning template lattices.

7. The method according to claim 6, wherein the generating at least one encoding region including the watermark information according to the watermark information may further comprise:
    selecting the count of template lattices from the plurality of positioning template lattices;
    filling information associated with the count of template lattices to the random positioning template lattices of the at least one encoding region;
    encoding the watermark information using the one or more encoding template lattices to generate encoded template lattices;
    scrambling orders of the encoded template lattices using an embedding key and information associated with the random positioning template lattices;
    filling information associated with the scrambled encoded template lattices into at least part of the at least one encoding region in order;
    performing hash computation on the information associated with the random positioning template lattices and information associated with the scrambled encoded template lattices by using the embedding key; and filling results from the hash computation to unfilled encoding template lattices and positioning template lattices.

8. The method according to claim 1, wherein the watermark information includes at least one of:
identification information of a user or device,
identification information of the carrier object, or
present time stamp when the watermark information is embedded.

9. A computing device comprising:
one or more processors, and
memory communicatively coupled to the one or more processors, the memory storing computer-executable instructions that when executed by the one or more processors, causing the one or more processors to perform operations including:
obtaining a carrier object and watermark information to be embedded in the carrier object;
generating at least one encoding region including the watermark information according to the watermark information, the at least one encoding region including a plurality of template lattices, and the plurality of template lattices comprising a plurality of positioning template lattices and one or more encoding template lattices;
obtaining a watermark image according to the at least one encoding region; and
embedding the watermark image in the carrier object.

10. The computing device according to claim 9, wherein the plurality of positioning template lattices comprise four positioning template lattices, and the one or more encoding template lattices comprise one encoding template lattice, wherein:
three positioning template lattices and the one encoding template lattice are placed on two by two template lattices at upper left of the at least one encoding region, and one remaining positioning template lattice is placed on a template lattice at lower right of the at least one encoding region.

11. The computing device according to claim 9, wherein the computer-executable instructions that, when executed by the one or more processors, causing the one or more processors to perform further operations including:
setting a count of positioning template lattices in the plurality of positioning template lattices as random positioning template lattices;
selecting the count of template lattices from the plurality of positioning template lattices;
filling information associated with the count of template lattices to the random positioning template lattices of the at least one encoding region;
encoding the watermark information using the one or more encoding template lattices to generate encoded template lattices;
scrambling orders of the encoded template lattices using an embedding key and information associated with the random positioning template lattices;
filling information associated with the scrambled encoded template lattices into at least part of the at least one encoding region in order;
performing hash computation on the information associated with the random positioning template lattices and information associated with the scrambled encoded template lattices by using the embedding key; and
filling results from the hash computation to unfilled encoding template lattices and positioning template lattices.

12. The computing device according to claim 9, wherein the watermark information includes at least one of:
identification information of a user or device,
identification information of the carrier object, or
present time stamp when the watermark information is embedded.

13. The computing device according to claim 9, wherein the at least one encoding region includes a plurality of encoding regions, and the obtaining a watermark image according to the encoding region may further comprise:
splicing the plurality of encoding regions to obtain the watermark image.

14. The computing device according to claim 9 wherein the at least one encoding region includes a plurality of equal number of square lattices in length and width.

15. The computing device according to claim 9, wherein the one or more encoding template lattices comprise the watermark information.

16. A computer-readable storage medium storing computer-readable instructions that when executed by the one or more processors, cause the one or more processors to perform operations comprising:
obtaining a carrier object and watermark information to be embedded in the carrier object;
generating at least one encoding region including the watermark information according to the watermark computer-readable storage medium information, the at least one encoding region including a plurality of template lattices, and the plurality of template lattices comprising a plurality of positioning template lattices and one or more encoding template lattices;
obtaining a watermark image according to the at least one encoding region; and
embedding the watermark image in the carrier object.

17. The computer-readable storage medium according to claim 16, wherein the plurality of positioning template lattices comprise four positioning template lattices, and the one or more encoding template lattices comprise one encoding template lattice, wherein:
three positioning template lattices and the one encoding template lattice are placed on two by two template lattices at upper left of the at least one encoding region, and one remaining positioning template lattice is placed on a template lattice at lower right of the at least one encoding region.

18. The computer-readable storage medium according to claim 16, wherein the computer-executable instructions that, when executed by the one or more processors, causing the one or more processors to perform further operations including:
setting a count of positioning template lattices in the plurality of positioning template lattices as random positioning template lattices;
selecting the count of template lattices from the plurality of positioning template lattices;
filling information associated with the count of template lattices to the random positioning template lattices of the at least one encoding region;
encoding the watermark information using the one or more encoding template lattices to generate encoded template lattices;
scrambling orders of the encoded template lattices using an embedding key and information associated with the random positioning template lattices;
filling information associated with the scrambled encoded template lattices into at least part of the at least one encoding region in order;

performing hash computation on the information associated with the random positioning template lattices and information associated with the scrambled encoded template lattices by using the embedding key; and filling results from the hash computation to unfilled encoding template lattices and positioning template lattices.

19. The computer-readable storage medium according to claim 16, wherein the watermark information includes at least one of:

identification information of a user or device, identification information of the carrier object, or present time stamp when the watermark information is embedded.

20. The computer-readable storage medium according to claim 16, wherein the at least one encoding region includes a plurality of encoding regions, and the obtaining a watermark image according to the encoding region may further comprise:

splicing the plurality of encoding regions to obtain the watermark image.

* * * * *